United States Patent
Tsukamoto et al.

(10) Patent No.: US 9,101,873 B2
(45) Date of Patent: Aug. 11, 2015

(54) MEMBRANE ELEMENT, GAS SEPARATION DEVICE AND INTERNAL COMBUSTION ENGINE

(75) Inventors: Masahiro Tsukamoto, Tokyo (JP); Atsushi Shimizu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 12 days.

(21) Appl. No.: 13/498,478

(22) PCT Filed: Sep. 28, 2010

(86) PCT No.: PCT/JP2010/066824
§ 371 (c)(1),
(2), (4) Date: Apr. 24, 2012

(87) PCT Pub. No.: WO2011/037255
PCT Pub. Date: Mar. 31, 2011

(65) Prior Publication Data
US 2012/0199004 A1    Aug. 9, 2012

(30) Foreign Application Priority Data

Sep. 28, 2009    (JP) .............................. P2009-222902
Sep. 28, 2009    (JP) .............................. P2009-222904

(51) Int. Cl.
*B01D 53/22*    (2006.01)
*B01D 63/14*    (2006.01)
(Continued)

(52) U.S. Cl.
CPC .............. *B01D 53/228* (2013.01); *B01D 53/22* (2013.01); *B01D 63/14* (2013.01); *B01D 65/003* (2013.01); *B01D 69/10* (2013.01); *B01D 71/36* (2013.01); *F02M 25/12* (2013.01); *B01D 63/08* (2013.01); *B01D 2256/12* (2013.01); *B01D 2257/102* (2013.01); *B01D 2259/4566* (2013.01);
(Continued)

(58) Field of Classification Search
CPC ...... B01D 53/22; B01D 53/228; B01D 63/08; B01D 63/14; B01D 65/003; B01D 69/10; B01D 71/36; F02M 25/12
USPC .................. 55/385.1, 385.2, 385.3, 490, 492; 95/43; 96/4
See application file for complete search history.

(56) References Cited

U.S. PATENT DOCUMENTS 3,389,031 A * 6/1968 Rosaen et al. ................... 156/74
3,478,498 A * 11/1969 Sauermann ..................... 55/492
(Continued)

FOREIGN PATENT DOCUMENTS

JP    2007-075699 A    3/2007
JP    2007-196130 A    8/2007
(Continued)

*Primary Examiner* — In Suk Bullock
*Assistant Examiner* — Anthony Shumate
(74) *Attorney, Agent, or Firm* — Morgan, Lewis & Bockius LLP

(57) ABSTRACT

The present invention provides a membrane element, a gas separation device, and an internal combustion engine capable of improving gas separation performance. A gas separation device 1 including membrane elements 2 includes rigid members 32 arranged in a direction intersecting folds of a pleated structure 26 in open regions R1 and R2 of the pleated structure 26 surrounded by a reinforcement frame 27. The open regions R1 and R2 are each separated into a supply region and an exhaust region of gas by an elastic epoxy resin adhesive S provided between the rigid member 32 and the pleated structure 26.

19 Claims, 20 Drawing Sheets

(51) Int. Cl.
    *B01D 65/00*     (2006.01)
    *B01D 69/10*     (2006.01)
    *B01D 71/36*     (2006.01)
    *F02M 25/12*     (2006.01)
    *B01D 63/08*     (2006.01)

(52) U.S. Cl.
    CPC ....... *B01D2313/00* (2013.01); *B01D 2313/025* (2013.01); *B01D 2313/20* (2013.01); *Y02T 10/121* (2013.01)

(56) References Cited

U.S. PATENT DOCUMENTS

| | | | |
|---|---|---|---|
| 4,247,316 A * | 1/1981 | Putman | 55/357 |
| 4,498,989 A * | 2/1985 | Miyakawa et al. | 210/450 |
| 5,141,309 A * | 8/1992 | Worwag | 356/72 |
| 5,205,156 A * | 4/1993 | Asano et al. | 73/38 |
| 5,429,649 A * | 7/1995 | Robin | 96/405 |
| 5,558,689 A * | 9/1996 | Yanagihara et al. | 55/492 |
| 5,653,831 A * | 8/1997 | Spencer | 156/69 |
| 5,891,207 A * | 4/1999 | Katta | 55/385.3 |
| 6,294,092 B1 * | 9/2001 | Salviato et al. | 210/644 |
| 6,966,940 B2 * | 11/2005 | Krisko et al. | 55/497 |
| 2003/0089664 A1* | 5/2003 | Phillips | 210/660 |
| 2004/0083895 A1* | 5/2004 | Kim | 96/414 |
| 2007/0277592 A1* | 12/2007 | Johansson et al. | 73/38 |
| 2009/0145093 A1* | 6/2009 | Krisko et al. | 55/321 |
| 2010/0212504 A1* | 8/2010 | Shimizu et al. | 96/13 |
| 2011/0005397 A1* | 1/2011 | Dackam et al. | 96/422 |
| 2013/0145748 A1* | 6/2013 | Shimizu et al. | 60/274 |

FOREIGN PATENT DOCUMENTS

| | | |
|---|---|---|
| JP | 2007-222841 A | 9/2007 |
| JP | 2010-234201 A | 10/2010 |
| JP | 2010-234202 A | 10/2010 |
| JP | 2010-279885 A | 12/2010 |
| WO | 2005/110581 A1 | 11/2005 |

* cited by examiner

MEMBRANE ELEMENT, GAS SEPARATION DEVICE AND INTERNAL COMBUSTION ENGINE

The present application is a U.S. National Phase Application of International Application No. PCT/JP2010/066824 filed Sep. 28, 2010 which claims the benefit of priority of Japanese Application No. P2009-222904 and P2009-222902 both filed Sep. 28, 2009, the disclosures of which are incorporated herein by reference in their entireties.

TECHNICAL FIELD

The present invention relates to a membrane element, a gas separation device, and an internal combustion engine.

BACKGROUND ART

Gas separation devices have been used in incinerators, air conditioners, diesel engines, and the like. The gas separation device can generate a nitrogen-enriched gas or an oxygen-enriched gas by allowing oxygen in the air including oxygen and nitrogen to pass through a membrane element. In addition, in the gas separation device, humidification or dehumidification of gas can be performed by allowing water vapor to pass through the membrane element.

The gas separation device in a combustion furnace can be used to suppress production of dioxin and to increase combustion efficiency. Specifically, oxygen in the air may be passed through a gas separation membrane to generate the oxygen-enriched air, which is introduced to the combustion furnace to increase the combustion temperature, thereby suppressing production of dioxin. By using the oxygen-enriched air, even a low-calorie fuel can be burnt at a prescribed temperature.

In addition, the gas separation device can be used to suppress nitrogen oxide by introducing the nitrogen-enriched air into a combustion furnace. The nitrogen-enriched air can be generated by allowing oxygen in the air to pass through a gas separation membrane to remove oxygen.

The gas separation device in an air conditioner has been used to separate the air into oxygen and nitrogen and to introduce the oxygen-enriched air into a room. It has also been used in humidification or dehumidification by allowing water vapor to pass through the membrane.

In internal combustion engines widely used in automobile engines, when the combustion temperature becomes high, nitrogen reacts with oxygen to produce nitrogen oxide ($NO_x$), which is exhausted. In the case of gasoline engines, a three-way catalyst serves as a system for removing nitrogen oxide ($NO_x$). This three-way catalyst can remove hydrocarbon (HC), carbon monoxide (CO), and nitrogen oxide ($NO_x$) in the exhaust gas simultaneously through an oxidation-reduction reaction.

However, in diesel engines in which a fuel is burnt with excessive air, the three-way catalyst does not function effectively since oxygen is included in the exhaust gas. Therefore, in the case of diesel engines, a method of decreasing an oxygen concentration in the air supplied to a combustion chamber to reduce the combustion temperature is an example of one of effective methods. As a specific example thereof, an EGR system (Exhaust Gas Recirculation system) is a method of reducing an oxygen concentration in the supply air by recirculating and mixing part of exhaust gas into the air.

Another example is a method of reducing nitrogen oxide ($NO_x$) by supplying the nitrogen-enriched air to a combustion chamber using a gas separation device. A method of reducing a combustion temperature by supplying the humidified air to a combustion chamber is also effective. The gas separation device can also be used as a device for generating the nitrogen-enriched air with a low oxygen concentration, or the humidified air.

In the gas separation devices used in various applications as described above, a variety of studies have been done so far in order to improve the ability of separating gas (gas separation performance). For example, Patent Literature 1 discloses a flat pleat-type membrane element and a gas separator using the membrane element. The membrane element described in Patent Literature 1 has a configuration in which a reinforcement frame is arranged on the outer periphery of a pleat molding formed by pleating a gas separation membrane. In the gas separator having this membrane element, a plate having an intake port and an exhaust port is used as a housing that accommodates the membrane element.

Patent Literature 2 discloses a gas separator configured to include two membrane elements with top surfaces thereof arranged to face each other, a pair of pressure plates sandwiching the two membrane elements from the bottom surface sides, a pipe for supplying or exhausting a gas mixture to the primary side of the top surface of the membrane element, and a secondary-side channel for discharging the air passing through the membrane element and being exhausted from the bottom surface side. In this gas separator, the pipe and the like for supplying the gas mixture are arranged on the left and right of the two membrane elements arranged above and below. The gas mixture flowing through the supply-side pipe passes through a slit-like narrow path to be supplied to the primary-side channel of the membrane element and further passes through a slit-like narrow path to be discharged to the exhaust-side pipe.

CITATION LIST

Patent Literature

[Patent Literature 1] International Publication No. WO2005/110581 brochure
[Patent Literature 2] Japanese Patent Application Laid-Open Publication No. 2007-75699

SUMMARY OF INVENTION

Technical Problem

However, in the conventional membrane elements, the partition between a supply region and an exhaust region is not sufficient, and a shortcut (short circuit) of gas occurs from the supply side to the exhaust side, leading to a problem that the gas separation performance is low. Furthermore, a member that forms a partition between the supply region and the exhaust region physically or chemically degrades over time, so that the gas separation performance is reduced over time.

The present invention is made to solve the aforementioned problem and aims to provide a membrane element, a gas separation device, and an internal combustion engine capable of improving the gas separation performance.

Solution to Problem

In order to solve the aforementioned problem, a membrane element according to the present invention includes a pleated structure formed by folding a sheet-like gas separation membrane substrate, and a reinforcement frame surrounding the pleated structure with both surface sides of the pleated structure being opened. The membrane element includes a rigid member arranged in a direction intersecting a fold of the pleated structure in at least one of opened regions of the pleated structure surrounded by the reinforcement frame, and a sealing portion provided between the rigid member and the pleated structure. The opened region is separated into a supply region and an exhaust region of gas by the sealing portion.

This membrane element includes the rigid member arranged in a direction intersecting the fold of the pleated structure in at least one of the opened regions of the pleated structure surrounded by the reinforcement frame. The opened portion surrounded by the reinforcement frame is separated into a supply region and an exhaust region of gas by the sealing portion provided between the rigid member and the pleated structure. Since the supply region and the exhaust region of gas are separated from each other by the sealing portion in this manner, it is possible to prevent gas from making a shortcut without passing through the pleated structure of the gas separation membrane substrate when the gas is fed from the supply region to the exhaust region. Therefore, the gas separation performance can be improved.

When a force is exerted on the sealing portion, the force applied to the sealing portion is received by the rigid member, thereby preventing flection of the pleated structure. Therefore, when compared with a conventional structure in which only the sealing portion is directly brought into abutment with the pleated structure, a sufficient contact pressure (sealing pressure) can be ensured. Then, a force is exerted more uniformly on the open region with the sufficient contact pressure in a state in which the sealing portion is in abutment with the rigid member. Thus, the supply region (upstream region) and the exhaust region (downstream side) of gas in the opened region of the pleated structure can be sealed reliably, thereby preventing a shortcut of gas. As a result, the hermeticity can be improved.

It is preferable that the sealing portion be an adhesive or a sealing agent. The adhesive or the sealing agent is preferably a material which has such flexibility that can follow deformation even when the pleated structure is subjected to deformation by stress, which substantially does not flow, and which can alleviate the stress. The rigid member and the pleated structure are bonded to each other by the adhesive or the sealing agent, whereby the rigid member and the pleated structure are tightly fixed to each other, thereby separating the supply region and the exhaust region from each other reliably. Accordingly, the shortcut preventing effect can be enhanced. Furthermore, since the rigid member and the sealing portion are bonded to each other, a force exerted on the rigid member is transmitted more uniformly to the sealing portion, thereby preventing flection of the pleated structure more. Thus, the sealability between the supply region and the exhaust region is improved.

It is preferable that, assuming a virtual plane on which apexes of a plurality of folds are arranged in the opened region of the pleated structure, the sealing portion be provided along the virtual plane. With such a configuration, a shortcut of gas can be prevented.

It is preferable that the sealing portion be provided like a plane along the virtual plane. In such a configuration, the sealing portion does not penetrate deeply between the folded gas separation membrane substrate, thereby preventing a reduction in gas separation performance by the sealing portion.

It is preferable that the sealing portion be provided to extend from the rigid member toward the reinforcement frame in a fold direction of the pleated structure, and that the supply region and the exhaust region should be defined each by the reinforcement frame and the sealing portion in the direction intersecting the fold, in both sides in the fold direction in the opened region. In such a configuration, the supply region and the exhaust region are defined on both sides of the opened region of the pleated structure. Therefore, the sealability can be ensured. In addition, a path through which gas to be separated moves along the gas separation membrane substrate is ensured to be long. Therefore, the gas separation performance can be made good.

It is preferable that an area of the sealing portion be 5% to 95% in the opened region of the reinforcement frame. With such a configuration, the areas of the supply region and the exhaust region can be optimized in gas separation. Furthermore, the supply region and the exhaust region can be separated freely by the sealing portion, and the area and shape of the supply region serving as an entrance of gas supplied to the inside of the pleated structure and the exhaust region serving as an exit of gas exhausted from the pleated structure can be adjusted freely and easily. More preferably, the area of the sealing portion is 10% to 90%. Further more preferably, it is 15% to 85%.

It is preferable that the rigid member be fixed to the reinforcement frame. With such a configuration, a stress applied to the rigid member is not distributed to the pleated structure but is distributed to the reinforcement frame, thereby ensuring the rigidity of the membrane element as a whole. Then, when the supply region and the exhaust region are separated, even if the rigid member receives a force, it is supported by the reinforcement frame, thereby preventing distortion of the pleated structure more. Therefore, the gas flow path is not deformed, and even more sufficient pressure contact can be ensured. As a result, the gas separation performance of the membrane element can be further improved.

It is preferable that the membrane element include a rib that extends in a longitudinal direction of the rigid member and is provided upright on the rigid member in a height direction of the pleated structure. With such a configuration, flection of the rigid member can be prevented. As a result, flection of the pleated structure is further prevented. Therefore, a more sufficient contact pressure can be ensured, thereby improving the use efficiency of the gas separation membrane. In addition, the flow path can be designed accurately since the flow path of gas in the gas separation device is not deformed.

It is preferable that the rigid member and the sealing portion be provided in both of the opened regions of the pleated structure surrounded by the reinforcement frame, and that the opened region be separated into a supply region and an exhaust region of gas by the sealing portion. In this manner, the configuration described above is provided in both of the opened regions, thereby preventing a shortcut on both surfaces of the membrane element.

A gas separation device according to the present invention includes the foregoing membrane element. The provision of the foregoing membrane element can improve the gas separation performance, and gas separation can be performed efficiently. In addition, the problem of a shortcut (short circuit) between the supply side and the exhaust side is eliminated, so that the gas flow design such as pressure loss can be carried out precisely. Furthermore, inconvenience of the sealing portion is eliminated, so that the assembly reproducibility of module performance is good in replacement of the membrane element.

An internal combustion engine according to the present invention includes the foregoing gas separation device. The provision of the foregoing gas separation device can improve the gas separation performance, and gas separation can be performed efficiently. $NO_x$ produced from the internal combustion engine can be reduced more.

Advantageous Effects of Invention

The present invention can improve the gas separation performance.

DESCRIPTION OF EMBODIMENTS

Figure 1:
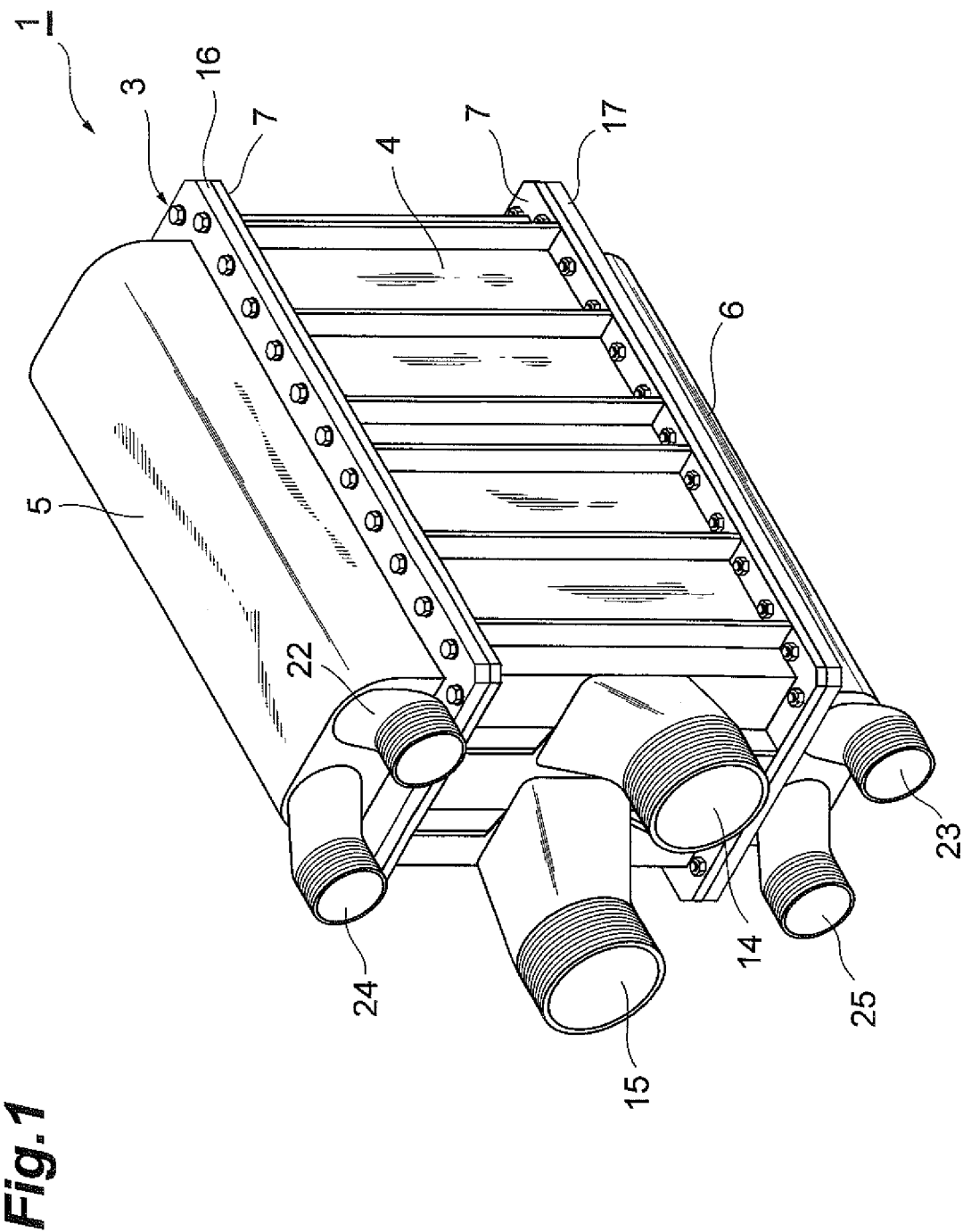
FIG. 1 is a perspective view showing an external view of a gas separation device installed with membrane elements according to a first embodiment.

Preferred embodiments of the present invention will be described in detail below with reference to the drawings. It is noted that the same or equivalent elements are denoted with the same reference numerals, and an overlapping description will be omitted, if any.

First Embodiment

Figure 2:
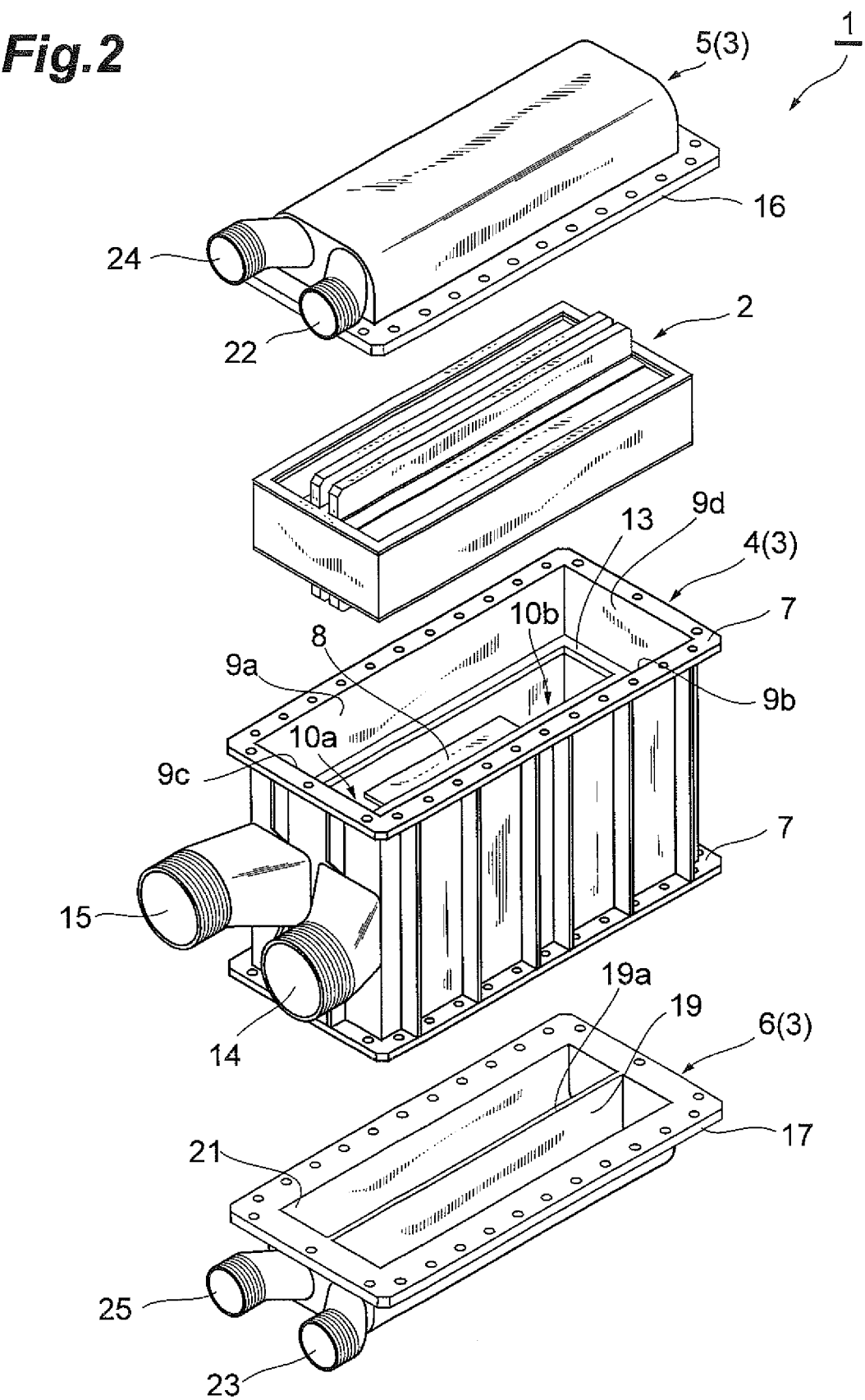
FIG. 2 is an exploded perspective view of the gas separation device shown in FIG. 1.

FIG. 1 is a perspective view showing an external view of a gas separation device installed with membrane elements according to a first embodiment. FIG. 2 is an exploded perspective view of the gas separation device shown in FIG. 1, and FIG. 3 is a cross-sectional view of the gas separation device shown in FIG. 1.

<Configuration of Gas Separation Device>

Figure 3:
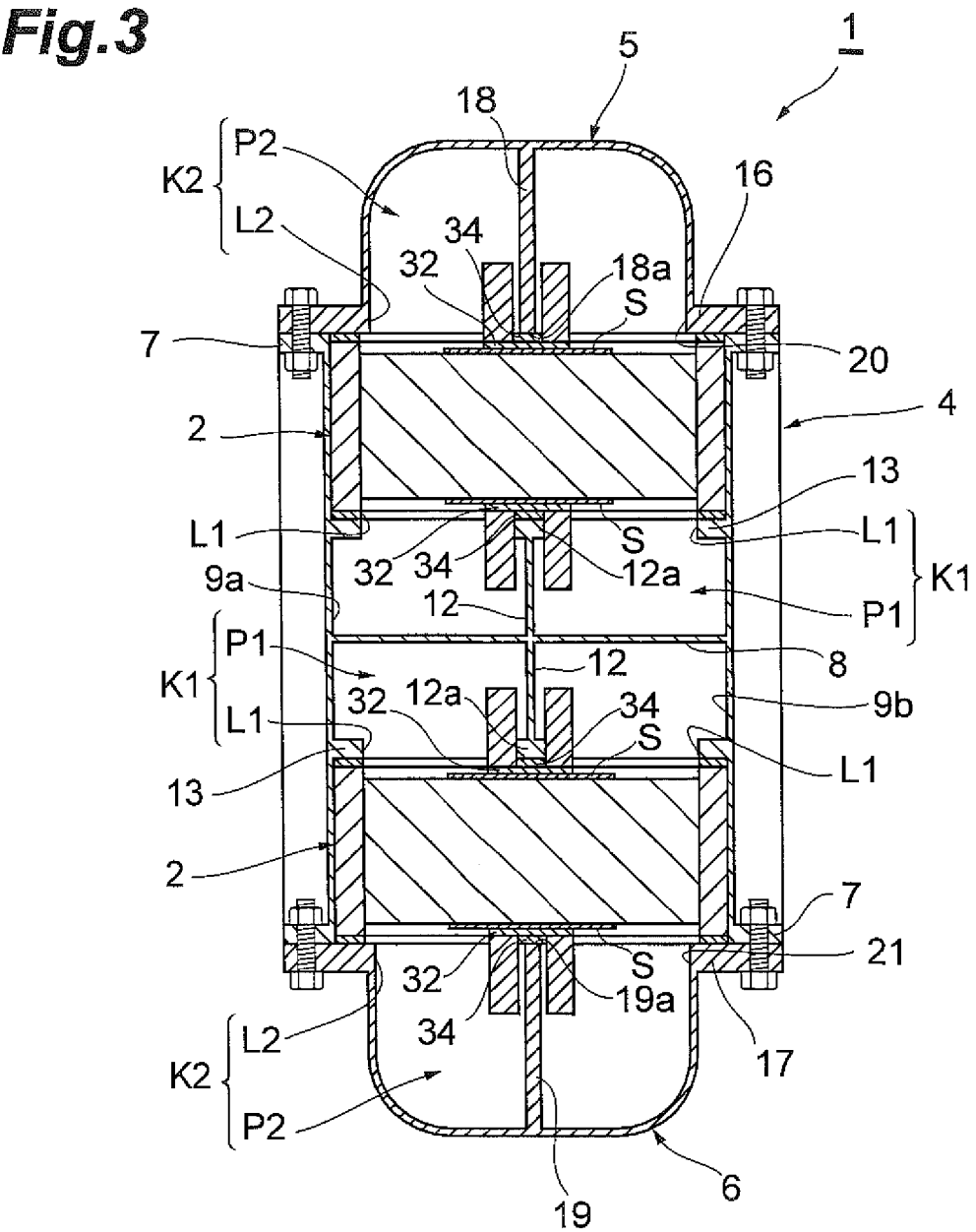
FIG. 3 is a cross-sectional view of the gas separation device shown in FIG. 1.

As shown in FIG. 1 to FIG. 3, a gas separation device 1 includes a housing 3 and membrane elements 2 accommodated in the housing 3. Primary-side passages P1 and secondary-side passages P2 are formed in the housing 3. The primary-side passages P1 and the secondary-side passages P2 are separated from each other by two membrane elements 2. In other words, in the housing 3, the membrane element 2 is sandwiched between the primary-side passage P1 on one side and the secondary-side passage P2 on the other side. The primary-side passage P1 is a passage for a gas mixture to be separated, and, in the present embodiment, is a passage through which the air flows. On the other hand, the secondary-side passage P2 is a passage through which a particular gas passing through the membrane element 2 mainly flows, and, in the present embodiment, the oxygen-enriched air mainly flows. In general, the primary side is defined as a side on which the partial pressure is higher when attention is given to a gas component selectively permeating through the membrane element 2. In many cases, the total pressure is higher on the primary side.

<Housing>

The housing 3 is produced, for example, from a variety of materials such as SUS (stainless still), aluminum, and resins, and is configured with a body portion 4 and a pair of top and bottom cover portions 5 and 6.

(Body Portion)

The body portion 4 has openings above and below and is shaped like a hollow box. The body portion 4 defines primary-side supply portions K1 in which a gas mixture flows in cooperation with the membrane elements 2.

The body portion 4 has a dividing plate 8 inside thereof. The dividing plate 8 is a plate member which divides four primary-side passages P1 (see FIG. 3) formed in the body portion 4 into two each above and below. This dividing plate 8 is disposed to extend between an inner wall 9a and an inner wall 9b at the approximately middle portion in the height direction (the upward and downward direction in the figure) of the body portion 4, and forms openings 10a and 10b with an inner wall 9c and with an inner wall 9d, respectively, of the body portion 4 (see FIG. 2).

A partition portion 12 is also provided in the body portion 4 in the direction intersecting the dividing plate 8. The partition portion 12 is a plate member which divides the primary-side passages P1 into a supply side and an exhaust side. The partition portion 12 is provided upright in the upward and downward directions with respect to the dividing plate 8 at the middle portion in the width direction (the right and left direction in the figure) of the body portion 4. The both ends of the partition portion 12 in the longitudinal direction abut on the inner walls 9c and 9d of the body portion 4. Thus, the four primary-side passages P1 are formed in the body portion 4.

Element support portions 13 for supporting the membrane elements 2 are provided on the inner walls 9a to 9d of the body portion 4. The element support portion 13 is provided along the four inner walls 9a to 9d, and its position in height is at a position lowered from the opening-side end portion of the body portion 4 by the height of the membrane element 2 (a reinforcement frame 27). The element support portion 13 is generally flush with a tip end portion 12a of the partition portion 12.

The element support portion 13 forms a primary-side communication portion L1 which brings the primary-side passage P1 and the primary side (open region) of the membrane element 2 into communication with each other. Specifically, the primary-side communication portion L1 is an opening portion which is formed by the element support portion 13 and the partition portion 12 and corresponds to the primary side of the membrane element 2 in a state in which the membrane element 2 is supported on the element support portion 13 of the body portion 4, as shown in FIG. 3. The primary-side supply portion K1 is configured with the primary-side passage P1 and the primary-side communication portion L1.

Connected to the body portion 4 are an intake pipe 14 for a gas mixture supplied to the primary-side passage P1 and an exhaust pipe 15 for exhausting the nitrogen-enriched air passing through a gas separation membrane 29 (described later) of a pleated structure 26 without selectively permeating. The intake pipe 14 is in communication with the supply side of the primary-side passage P1, and the exhaust pipe 15 is in communication with the exhaust side of the primary-side passage P1. The intake pipe 14 and the exhaust pipe 15 are arranged side by side on the side of the inner wall 9c (one end side) of the body portion 4. In other words, the intake pipe 14 and the exhaust pipe 15 are provided on the body portion 4 such that their openings are oriented in the same direction in the longitudinal direction of the body portion 4. The inner diameters of the intake pipe 14 and the exhaust pipe 15 are each approximately equal to the diameter of the primary-side passage P1 (the hydraulic diameter of a square pipe having a square cross section that is formed by the dividing plate 8 and the membrane element 2).

Flange portions 7 protruding in the front/back and right/left directions are provided at end portions in the upward and downward direction of the body portion 4. The flange portions 7 are bolted in a state in which flange portions 16 and 17 of the cover portions 5 and 6 described later are in abutment therewith, so that the cover portions 5 and 6 are fixed to the body portion 4.

(Cover Portion)

The cover portions 5 and 6 are members arranged above and below the body portion 4 and are fixed to the body portion 4 such that the flange portions 16 and 17 protruding in the width direction are bolted to the flange portions 7 of the body portion 4. The cover portions 5 and 6 define secondary-side exhaust portions K2 through which a particular gas and a scavenging gas flow in cooperation with the membrane elements 2.

Partition portions 18 and 19 are provided inside the cover portions 5 and 6, respectively. The partition portions 18 and 19 extend in the longitudinal direction at the approximately middle portion in the width direction of the cover portions 5 and 6, and are provided upright toward the opening sides. The partition portions 18 and 19 partition the spaces formed inside the cover portions 5 and 6 into the supply side and the exhaust side in the secondary-side passages P2. Front end portions 18a and 19a of the partition portions 18 and 19 are generally flush with the flange portions 16 and 17 of the cover portions 5 and 6, respectively.

Opening portions 20 and 21 of the cover portions 5 and 6 function as the secondary-side communication portions L2 which bring the secondary-side passages P2 and the secondary side (open region) of the membrane elements 2 into communication with each other. Specifically, as shown in FIG. 3, the secondary-side communication portions L2 are opening portions, that is, the opening portions 20 and 21, corresponding to the secondary side of the membrane elements 2 in a state in which the membrane elements 2 are supported on the element support portions 13 of the body portion 4. The secondary-side exhaust portion K2 is configured to have the secondary-side passage P2 and the secondary-side communication portion L2.

Connected to the cover portions 5 and 6 are intake pipes 22 and 23 for the scavenging gas supplied to the secondary-side passages P2, and exhaust pipes 24 and 25 for the scavenging gas accompanied by oxygen ($O_2$) selectively permeating through the gas separation membrane 29 of the pleated structure 26. The intake pipes 22 and 23 are in communication with the supply side of the secondary-side passages P2, and the exhaust pipes 24 and 25 are in communication with the exhaust side of the secondary-side passages P2. The intake pipes 22 and 23 and the exhaust pipes 24 and 25 are arranged side by side on one end side in the longitudinal direction of the cover portions 5 and 6. In other words, the intake pipes 22 and 23 and the exhaust pipes 24 and 25 are provided at the cover portions 5 and 6 such that their openings are oriented in the same direction in the longitudinal direction of the cover portions 5 and 6. It is noted that the intake pipes 22 and 23 may be used as exhaust pipes, and the exhaust pipes 24 and 25 may be used as intake pipes.

<Membrane Element>

Figure 4:
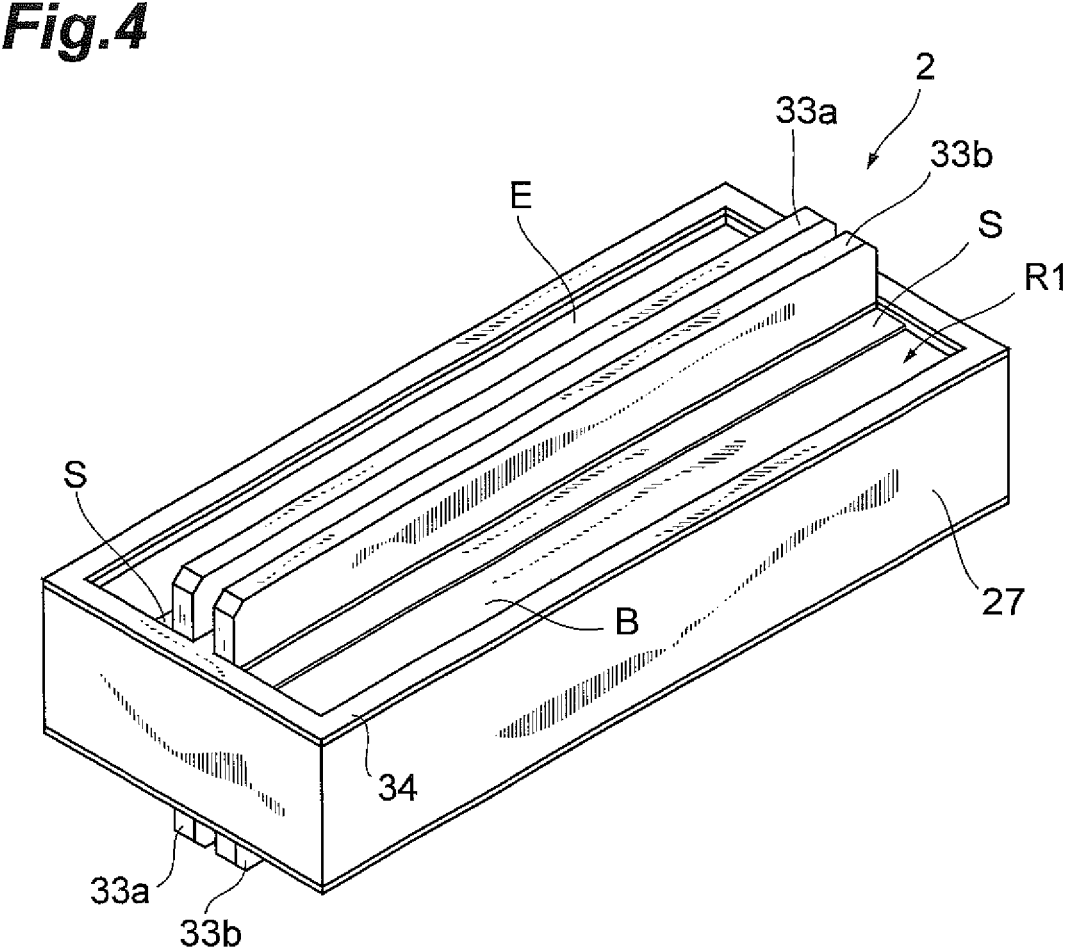
FIG. 4 is a perspective view showing an external view of the membrane element.
Figure 5:
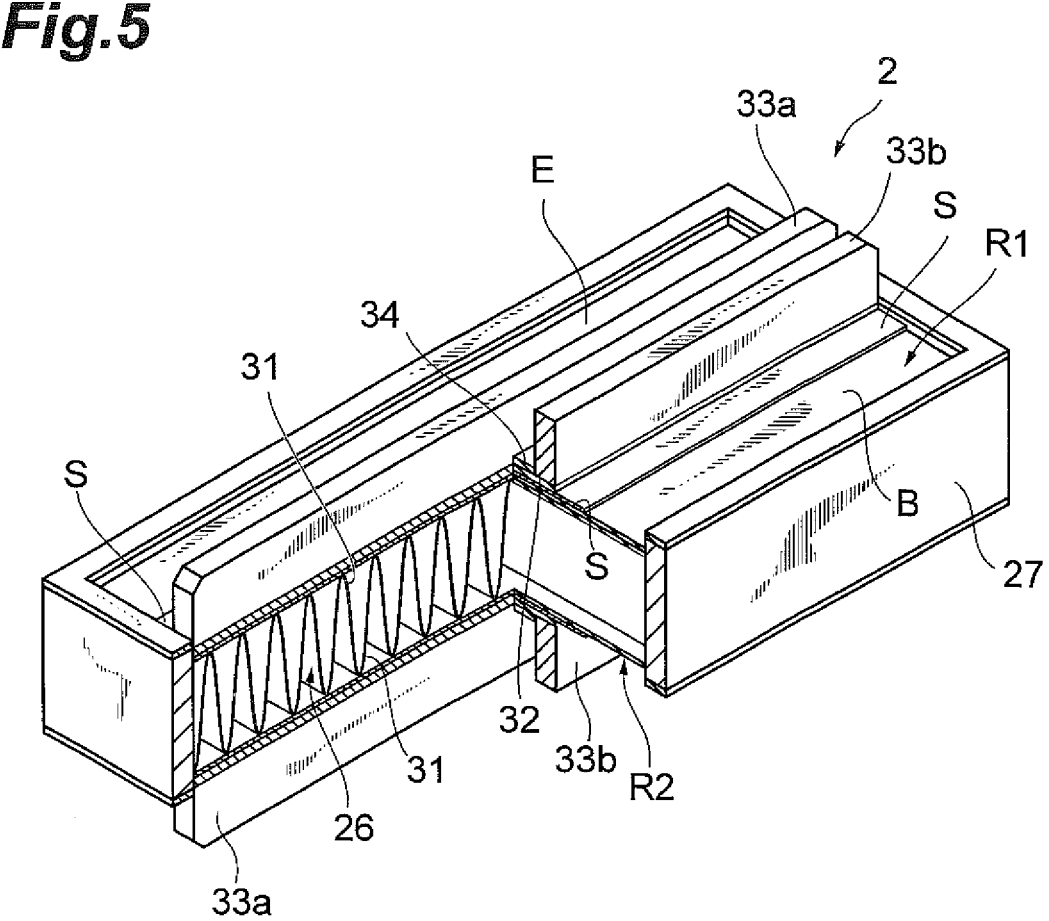
FIG. 5 is a cross-sectional perspective view showing the membrane element in FIG. 4 partially cut away.
Figure 6:
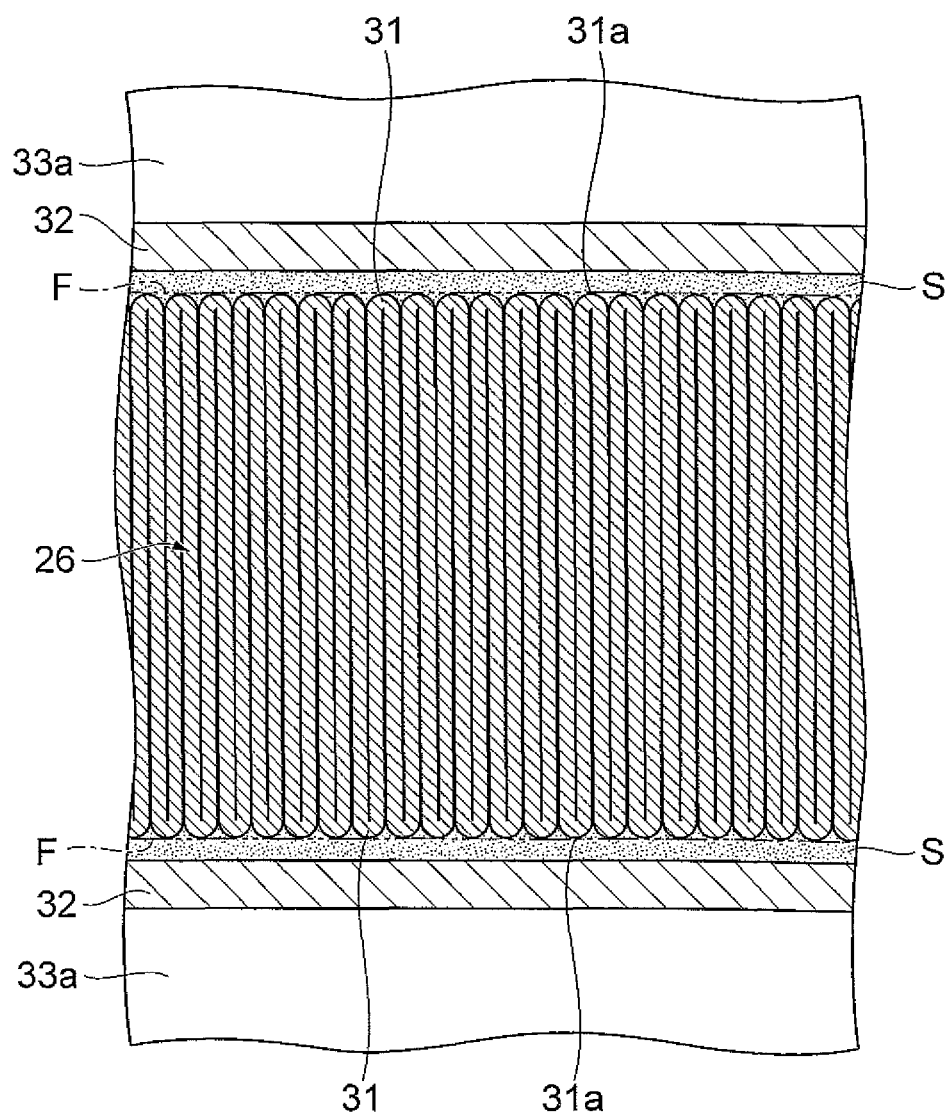
FIG. 6 is a cross-sectional view of a pleated structure in the membrane element in FIG. 5 as viewed from a fold direction.
Figure 7:
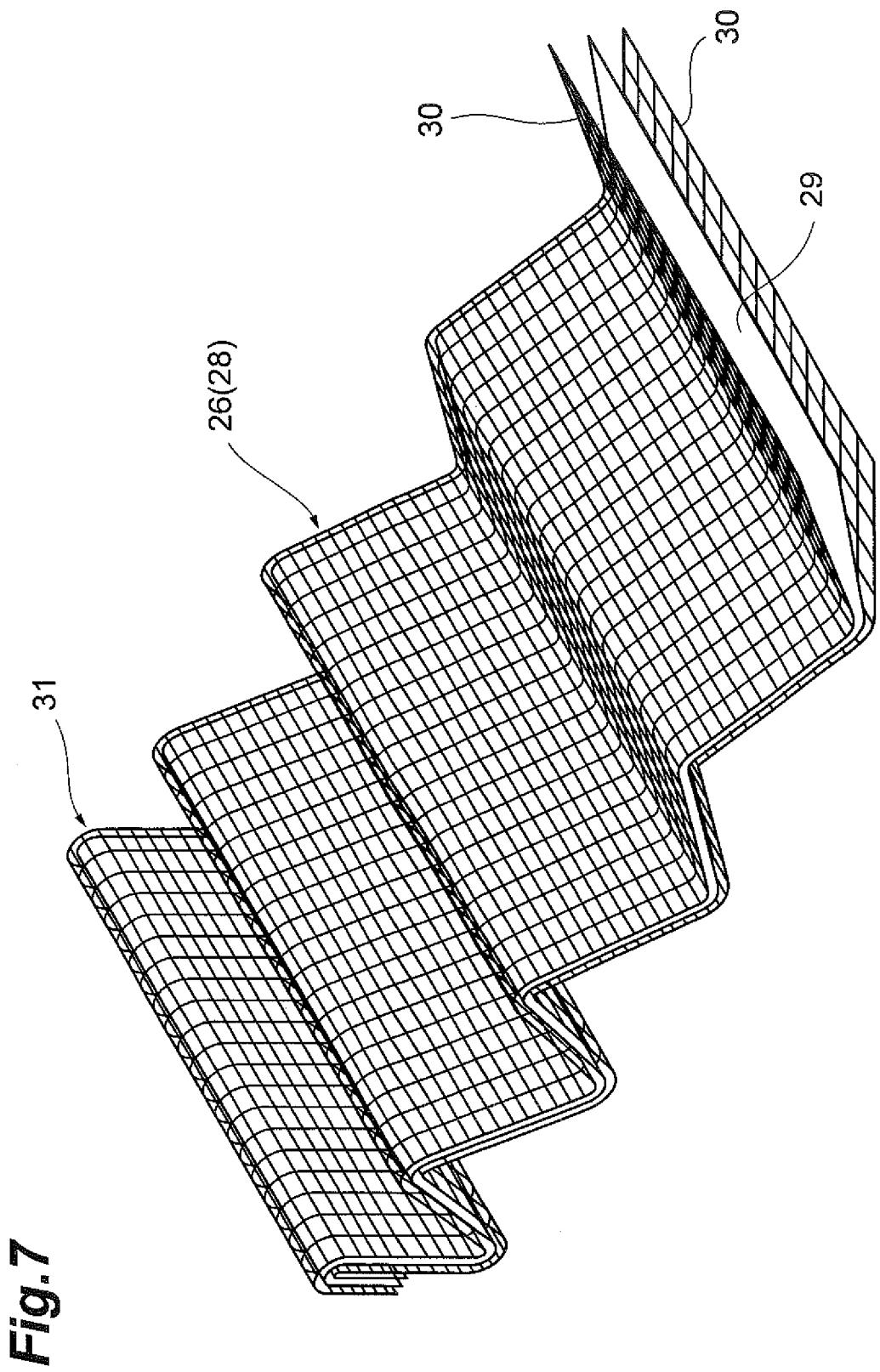
FIG. 7 is a perspective view showing a gas separation membrane substrate before pleating.

The membrane element 2 will now be described in detail. FIG. 4 is a perspective view showing an external view of the membrane element. FIG. 5 is a cross-sectional perspective view showing the membrane element in FIG. 4 partially cut away. FIG. 6 is a cross-sectional view of the pleated structure in the membrane element in FIG. 5 as viewed from a fold direction. FIG. 7 is a perspective view showing a gas separation membrane substrate before pleating.

As shown in FIG. 4 to FIG. 7, the membrane element 2 is configured such that the pleated structure 26 is surrounded by the reinforcement frame 27.

The pleated structure 26 is a structure obtained by pleating a flat membrane-like (sheet-like) gas separation membrane substrate 28. The gas separation membrane substrate 28 is formed such that the flat membrane-like gas separation membrane 29 is integrated with a pair of mesh-like breathable reinforcement materials 30 arranged to sandwich the gas separation membrane 29. Gaps as shown in FIG. 5 may be formed between the gas separation membranes 29. However, as shown in FIG. 6, preferably, the gas separation membranes 29 are in intimate contact with each other with spacers interposed, without gaps being formed therebetween.

As shown in FIG. 5, in the case of the pleated structure having a gap between pleats, a sealing portion (elastic epoxy resin adhesive S described later) is preferably provided between a rigid member and the pleated structure along a virtual plane on which the apexes of a plurality of folds are arranged. Here, the sealing portion may be formed only on the apexes of the pleats or may be formed like a plane along the virtual surface. It is preferable to form like a plane in view of easiness of production.

As shown in FIG. 7, the gas separation membrane 29 is a flat membrane and is a selectively permeable membrane having the characteristic of preferentially transmitting oxygen gas ($O_2$) from the air. The gas separation membrane in the present invention is not limited to a selectively permeable membrane that preferentially transmits oxygen from the air but may be any selectively permeable membrane that has the characteristic of preferentially transmitting a particular gas such as carbonic acid gas or water vapor from the air.

The breathable reinforcement material 30 serves as means for preventing intimate contact between the gas separation membranes 29 to ensure a gas passage thereby achieving a good membrane use efficiency. The breathable reinforcement material 30 also has an auxiliary function of imparting a freestanding property required for the pleated structure 26.

"Pleating" refers to processing of repeating valley folds and mountain folds of the flat membrane-like gas separation membrane substrate 28 at a specific pitch. As a result of pleating, the gas separation membrane substrate 28 forms the pleated structure 26 in such a manner that it is alternately folded like an accordion to form a plurality of folds 31, that is, in a pleated manner. This pleating allows a larger area to be accommodated in the same projected area or in the same volume as compared with a flat membrane without pleating. In general, the pleating is performed after the gas separation membrane 29 and the breathable reinforcement materials 30 are stacked. However, it is also possible to insert the breathable reinforcement materials 30 between pleats after pleating is performed solely on the gas separation membrane 29.

In the present embodiment, the "length" of the pleat is a length parallel with the pleat direction, the "height" of the pleat is a height from one peak to the other peak of the pleated structure 26, and the "width" of the pleat is a length in the direction vertical to (intersecting) the pleat direction. Known methods can be used as a pleating method. For example, a reciprocating (accordion) pleating machine or a rotary pleating machine can be used.

The material, size, and characteristics of the gas separation membrane 29 and the breathable reinforcement material 30 applicable to the pleated structure 26 of the present invention will now be described in more detail.

(Gas Separation Membrane)

The gas separation membrane 29 is a flat membrane and may be any selectively permeable membrane that has the characteristic of preferentially transmitting a particular gas from a gas mixture. Examples of the particular gas include oxygen and nitrogen, and in addition, water vapor, carbon dioxide, hydrogen, helium, argon, aliphatic hydrocarbon, aromatic hydrocarbon, hydrogen sulfide, and ammonia. A variety of materials can be used for the gas separation membrane. When generation of the nitrogen-enriched air is intended as in the foregoing embodiment, examples of the material of the gas separation membrane include polydimethylsiloxane, polydiphenylsiloxane, polymethylphenylsiloxane, copolymers of polydimethylsiloxane, poly-4-methylpentene-1, polytetrafluoroethylene, copolymers of polytetrafluoroethylene, copolymers of perfluoro-2, 2-dimethyl-1,3-dioxole, poly-p-phenyleneoxide, polyvinyltrimethylsilane, fluorinated polymer/siloxane copolymer, poly[1-(trimethylsilyl)-1-propyne], cellulose acetate, polypropylene, polyethylene, polybutadiene, polyvinyl acetate, polystyrene, and polymers of intrinsic microporosity (PIMs) and copolymers thereof. Among those, organopolysiloxane-polyurea-polyurethane block copolymers, copolymers of perfluoro-2,2-dimethyl-1,3-dioxole and tetrafluoroethylene, polymers of intrinsic microporosity (PIMs) are preferred. A selectively permeable inorganic material represented by the A-type zeolite can be used.

The gas permeability of the gas separation membrane 29 can be expressed by a permeation rate and a separation coefficient. Here, a permeation rate R is represented by the amount of gas permeation in unit time, unit area, and unit partial pressure difference, where a unit called GPU (Gas Permeation Unit)=$10^{-6}$ $cm^3$ (STP)/$cm^2$seccmHg is widely used in practice. The permeation rate per unit membrane thickness is referred to as a permeation coefficient P, where barrer $10^{-10}$ $cm^3$ (STP)cm/$cm^2$seccmHg is widely used in practice. The permeation rate is the property of the membrane, whereas the permeation coefficient is the property of the material. Therefore, however excellent the permeation coefficient is, the material is not suitable for gas separation if it does not have the necessary and sufficient suitability for a thin membrane. A separation coefficient $\alpha$ is a ratio of any given gas permeation coefficient. The permeation rate and the separation coefficient are selected as appropriate according to the intended use. It is preferable that the permeation rate and the separation coefficient be set to the values as follows, for example, when the device is used to supply a nitrogen-enriched gas for an internal combustion engine.

The permeation rate R of oxygen is preferably 100 GPU or more, more preferably 1000 GPU or more, further more preferably 2000 GPU or more, and even more preferably 3000 GPU or more. Especially, 5000 GPU or more is preferred.

The separation coefficient $\alpha$ (=$RO_2/RN_2$) of oxygen and nitrogen is preferably 1.1 or more, more preferably 1.5 or more, further more preferably 1.8 or more, even more preferably 2.0 or more, especially preferably 2.2 or more, extremely preferably 2.4 or more, and most preferably 2.6 or more. The case where $\alpha$ is less than 1.1 is undesirable since a large amount of nitrogen accompanying oxygen moves from the primary side to the secondary side. It is preferable that $\alpha$ be higher since the amount of nitrogen accompanying oxygen can be suppressed. In general, there is a trade-off between the separation coefficient and the permeation coefficient.

The membrane thickness of the gas separation membrane 29 is preferably 1 μm or more and 1000 μm or less. The lower limit of the membrane thickness is more preferably 5 μm or more, further more preferably 8 μm or more, and most preferably 10 μm or more. The upper limit of the membrane thickness is more preferably 500 μm or less, further more preferably 200 μm or less, even more preferably 100 μm or less, especially preferably 50 μm or less, and most preferably 20 μm or less. If the membrane thickness is less than 1 μm, the mechanical strength may be insufficient. If the membrane thickness exceeds 1000 μm, the permeation rate may be insufficient.

In general, it is preferable that the membrane thickness of the gas separation membrane 29 be thinner, because the permeation rate can be improved with the separation coefficient being kept. However, in order to avoid breakage, etc., resulting from the thinner membrane, it is often formed on a support membrane excellent in gas permeability and mechanical strength. The gas separation membrane 29 having such a structure may be referred to as a composite membrane. The gas separation layer formed on the support membrane may be referred to as a separation layer, a skin layer, or an active layer, and the support membrane may be referred to as a support layer. The composite membrane can be obtained, for example, by coating, impregnating, or contacting the support film with a gas permeable material. In this embodiment, the composite membrane is used.

A variety of flat membranes can be used as the support layer of the gas separation membrane 29 as long as they are excellent in gas permeability and mechanical strength and can be pleated. Fabrics, unwoven fabrics, microporous membranes, and the like can be used. Examples of the microporous membrane include a polyimide microporous membrane, a PVDF microporous membrane, a polyolefin microporous membrane, a polysulfone microporous membrane, a polyethersulfone microporous membrane, and any other various known microporous membranes. Among those, the polyolefin microporous membrane is preferred, and in particular, a polyethylene microporous membrane is preferred. A polyolefin microporous membrane, which is used as a separator for a lithium-ion battery, can be used suitably. The polysulfone microporous membrane and the polyethersulfone microporous membrane, which are used as an UF membrane, are preferred.

The porosity of the support layer of the gas separation membrane 29 is preferably 5% or more and 95% or less. The lower limit of the porosity is more preferably 10% or more, further more preferably 20% or more, even more preferably 30% or more, and most preferably 40% or more. If the porosity is less than 5%, the gas permeability may be insufficient. If the porosity exceeds 95%, the mechanical strength may be insufficient.

The porosity of the support layer was measured by the following method. A sample of 10 cm square was taken from the support layer. The equation below was used in calculation based on the volume and mass of the sample. The resin density (g/cm³) means the density of resin, which is a component of the support layer, and can be measured by a density gradient method in conformity with ASTM-D1505.

$$\text{Porosity (\%)} = [\text{volume (cm}^3\text{)} - \text{mass (g)/resin density}]/\text{volume (cm}^3\text{)} \times 100$$

The mean pore size of the support layer of the gas separation membrane 29 is preferably 0.1 nm or more and 10 µm or less. The lower limit of the mean pore size is more preferably 1 nm or more, and further more preferably 10 nm or more. The upper limit of the mean pore size is more preferably 1 µm or less, further more preferably 500 nm or less, even more preferably 200 nm or less, and especially preferably 100 nm or less. The case where the mean pore size is less than 0.1 nm is undesirable since the porosity and the surface opening ratio are often low. The case where the mean pore size exceeds 10 µm is undesirable since pin holes are easily produced in the gas separation layer.

The membrane thickness of the gas separation layer of the gas separation membrane 29 is preferably 1 nm or more and 10 µm or less. The lower limit of the membrane thickness is more preferably 10 µm or less, further more preferably 20 nm or more, and most preferably 50 nm or more. The upper limit of the membrane thickness is more preferably 3 µm or less, further more preferably 1 µm or less, even more preferably 500 nm or less, especially preferably 300 nm or less, extremely preferably 200 nm or less, and most preferably 100 nm or less. If the permeation coefficient is high enough, even the membrane thickness exceeding 3 µm can be used suitably.

(Breathable Reinforcement Material)

The breathable reinforcement material 30 can be provided on both surfaces or one surface of the gas separation membrane 29. When the pressure difference between the both surfaces of the gas separation membrane 29 is significant, the breathable reinforcement material 30 is preferably provided at least on the lower pressure side. Examples of the breathable reinforcement material 30 may include fabrics, unwoven fabrics, resin nets such as polypropylene, polyester, and nylon, and metal nets. Among those, the resin nets and the metal nets are preferred. These nets can be produced from a woven structure using a loom or by drawing processing after extrusion. A plain-woven net is preferred because of its simple structure. Furthermore, a net having a structure in which the intersections in plain weave are fused is more preferred because its strength is improved.

The thickness of the breathable reinforcement material 30 can be obtained from the average value of measurements at a plurality of points in the vicinity of the intersections of the net. The thickness is preferably 10 µm or more and 5000 µm or less. The lower limit of the thickness is more preferably 50 µm or more, further more preferably 100 µm or more, even more preferably 200 µm or more, and especially preferably 300 µm or more. The upper limit of the thickness is more preferably 2000 µm or less, further more preferably 1000 µm or less, and most preferably 500 µm or less. If the thickness is less than 10 µm, the mechanical strength may be insufficient. If the thickness exceeds 5000 µm, the gas permeability may be reduced. The thickness of the breathable reinforcement material 30 depends on the degree of compression during measurement and therefore is preferably measured with the degree of compression in the case where the membrane element is formed and with the degree of compression in the case where a total pressure difference during operation is applied to the membrane element.

The porosity of the breathable reinforcement material 30 can be found as a numeric value obtained by dividing the projected area of the porous portion, as viewed above from its plane, by the total area. The porosity is preferably 30% or more and 95% or less. The lower limit of the porosity is more preferably 40% or more, further more preferably 50% or more, even more preferably 60% or more, especially preferably 70% or more, extremely preferably 80% or more, and most preferably 90% or more. If the porosity is less than 30%, the gas separation performance may be insufficient. If the porosity is less than 95%, the mechanical strength may be insufficient. The porosity of the breathable reinforcement material 30 depends on the degree of compression during measurement and is therefore preferably measured with the degree of compression in the case where the pleated structure is formed and with the degree of compression in which the total pressure difference during operation is applied to the pleated structure.

The line diameter in the case where a net is used as the breathable reinforcement material 30 is preferably 0.01 mm or more and 2 mm or less. The lower limit of the line diameter is more preferably 0.02 mm or more, further more preferably 0.04 mm or more, even more preferably 0.06 mm or more, and especially preferably 0.08 mm or more. The upper limit of the line diameter is more preferably 1 mm or less, further more preferably 0.6 mm or less, even more preferably 0.4 mm or less, and especially preferably 0.2 mm or less. When a net is used as the breathable reinforcement material 30, meshes are preferably 2 or more and 1000 or less. The lower limit number of meshes is more preferably 5 or more. The upper limit number of meshes is more preferably 100 or less, further more preferably 50 or less, and even more preferably 30 or less. In order to protect the gas separation membrane 29, a thin breathable reinforcement material may be provided between the gas separation membrane 29 and the breathable reinforcement material 30. More preferably, the breathable reinforcement material 30 of this type has one surface or both surfaces thereof subjected to smoothing processing.

(Reinforcement Frame)

The reinforcement frame 27 is a structural material that is hermetically bonded to the outer periphery of the pleated structure 26 to reinforce the pleated structure 26 thereby constructing the membrane element 2. More specifically, the reinforcement frame 27 surrounds the outer periphery of the pleated structure 26 with both surface sides, namely, one surface side and the other surface side, being opened to form a pair of upper and lower open regions R1 and R2 which are hermetically separated from each other. The open regions R1 and R2 are each approximately rectangular. A variety of materials, including resins such as epoxy resin, metals, and FRP (Fiber Reinforced Plastics) can be used for the reinforcement frame 27 according to the purpose.

(Rigid Member)

Here, in particular in the present embodiment, the membrane element 2 includes rigid members 32. The rigid member 32 is formed, for example, of a plate member of polycarbonate or the like. In the present embodiment, the rigid member can receive a pressure (gasket linear load) applied to a gasket 34 described later. The rigid members 32 extend in the direction intersecting the folds 31 of the pleated structure 26 (the longitudinal direction of the reinforcement frame 27) and are arranged at the approximately middle portions of the open regions R1 and R2 so as to be in intimate contact with the pleated structure 26 in the open regions R1 and R2 of the reinforcement frame 27. More specifically, the open regions R1 and R2 of the reinforcement frame 27 each have its surface coated, for example, with the elastic epoxy resin adhesive (sealing portion) S, so that the rigid member 32 rests on the coating of the elastic epoxy resin adhesive S. Thus, the rigid members 32 are tightly fixed to the pleated structure 26 in the open regions R1 and R2 of the reinforcement frame 27 with the elastic epoxy resin adhesive S interposed therebetween. A variety of resins, metal materials, and combinations thereof can be used as the rigid member 32. The rigid member 32 is preferably a material that is less deformed when a force is applied. More specifically, it is preferable that the tensile yield stress be 5 MP or more, the tensile elastic modulus should be 100 or more, and the bending stress be 10 or more. More preferably, the tensile yield stress is 20 MP or more, the tensile elastic modulus is 700 or more, and the bending stress is 40 or more. Further more preferably, the tensile yield stress is 50 MP or more, the tensile elastic modulus is 1000 or more, and the bending stress is 60 or more. The tensile yield stress and the tensile elastic modulus are measured in conformity with ISO 527. The bending stress is measured in accordance with ISO 178.

(Sealing Portion)

The elastic epoxy resin adhesive S functions as a sealing portion which separates the supply side (supply region) and the exhaust side (exhaust region) of gas from each other in each of the open regions R1 and R2 of the reinforcement frame 27 and forms a flow path for the gas passing through the inside of the pleated structure 26. As shown in FIG. 6, assuming a virtual plane F on which apex portions 31a of the plurality of the folds 31 are arranged, the elastic epoxy resin adhesive S is provided like a plane along the virtual plane F in the open regions R1 and R2 of the pleated structure 26.

The elastic epoxy resin adhesive S is applied on the open regions R1 and R2 with its width size larger than the width size of the rigid member 32. The adhesion region thereof adjusts the areas of a supply region (supply port B) and an exhaust region (exhaust port E). In other words, the elastic epoxy resin adhesive S is provided to extend from the rigid member 32 toward the reinforcement frame 27 in the fold direction of the pleated structure 26. The supply side (supply port B) and the exhaust side (exhaust port E) are each defined by the reinforcement frame 27 and the elastic epoxy resin adhesive S along the direction intersecting the folds of the pleated structure 26. The area of the elastic epoxy resin adhesive S is 5% to 95% in the open regions R1 and R2, and the area of the supply side (supply port B) and the exhaust side (exhaust port E) is 5% to 95% in the open regions R1 and R2.

The adhesive to be used to adhesively fix the rigid member 32 is preferably a material which has flexibility that can follow deformation even when the pleated structure is subjected to deformation by a stress, which substantially does not flow, and which can alleviate the stress. Examples of such an adhesive or sealing agent may include bisphenol epoxy resins, alicyclic epoxy resins, silicone-based resins, urethane-based resins, acrylic-based resins, polyolefin-based resins, rubber-based resins, and hot melt resins. These materials may be used alone or may be mixed. Any of a one-part type, a two-part type, a solvent-type, a non-solvent type, and a setting-type may be used. An inorganic material may be added. A sealing agent may be used as the sealing portion.

(Rib Portion)

The both end portions in the longitudinal direction of the rigid member 32 are supported in abutment with the reinforcement frame 27. On the both end sides in the width direction of the rigid member 32, a pair of rib portions 33a and 33b are provided upright. The rib portions 33a and 33b are reinforcement members formed, for example, of a material such as polycarbonate to reinforce the strength (rigidity) of the rigid member 32. A variety of resin and metal materials, or combinations thereof can be used as the rib portions 33a and 33b.

(Gasket)

In the present embodiment, the gasket 34 rests on the upper portion of the rigid member 32 in intimate contact therewith. The gasket 34 is formed, for example, of nitrile rubber (NBR). In the present embodiment, the gasket 34 cooperates with the elastic epoxy resin adhesive S to separate the supply side and the exhaust side of gas from each other in each of the open regions R1 and R2 of the reinforcement frame 27 and forms a flow path for the gas passing through the inside of the pleated structure 26. The gasket 34 has a shape corresponding to the shapes of the rigid member 32 and the reinforcement frame 27.

<Arrangement of Membrane Element>

The membrane elements 2 having the structure above are arranged between the body portion 4 and the pair of cover portions 5 and 6 in the housing 3 as shown in FIG. 3. Specifically, the reinforcement frame 27 is sandwiched in abutment with the element support portions 13 of the body portion 4 and in abutment with the flange portions 16 and 17 of the cover portions 5 and 6, with the gaskets 34 interposed therebetween, whereby the membrane elements 2 are fixed in the housing 3. Here, the partition portions 18 and 19 of the cover portions 5 and 6 as well as the partition portion 12 of the body portion 4 are positioned between the rib portions 33a and 33b of the membrane elements 2 and are in abutment with the gaskets 34. Thus, the gaskets 34 are pressed from the partition portions 12, 18, and 19 to separate the supply side (supply port B) and the exhaust side (exhaust port E) from each other in the open regions R1 and R2 of the reinforcement frames 27. In other words, the flow path direction of gas in the pleated structure 26 is the width direction of the pleated structure 26.

Figure 8:
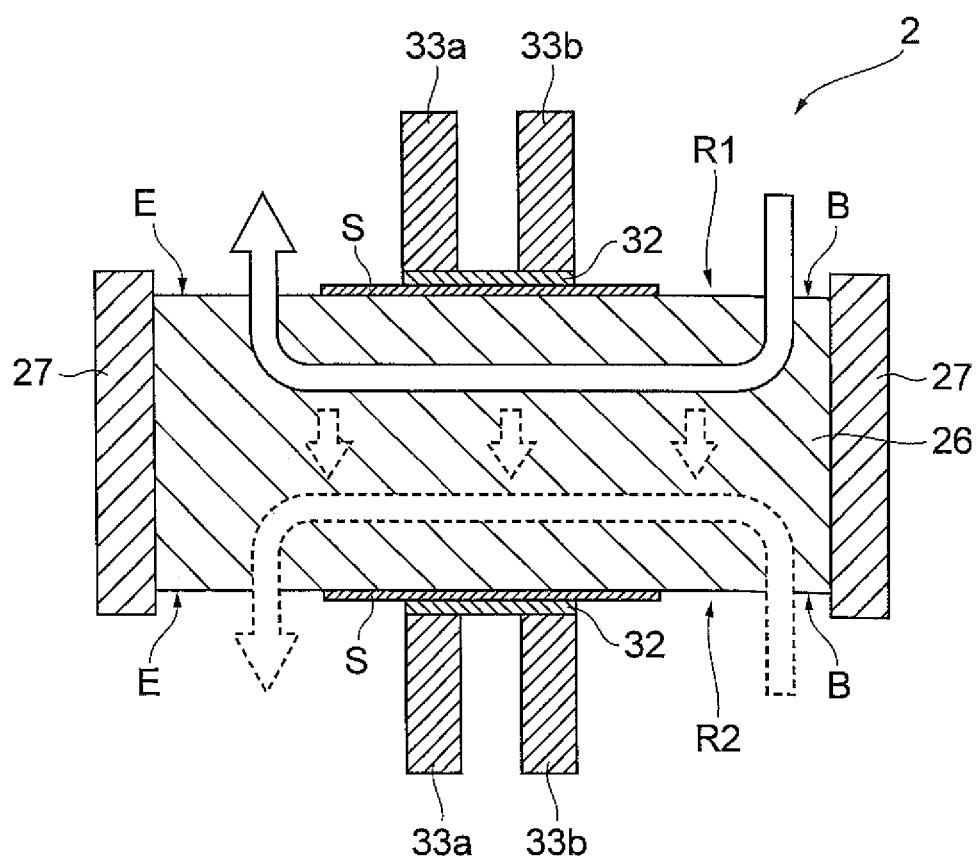
FIG. 8 is a diagram showing an example of a gas flow path in the membrane element.

The flow path direction of the gas in the pleated structure 26, that is, the membrane element 2 will be described specifically with reference to FIG. 8. FIG. 8 is a diagram showing an example of a gas flow path in the membrane element. As shown in FIG. 8, for example, the air, which is a gas mixture to be separated, supplied from the supply region (supply port B) of the open region R1 moves along the pleat direction (width direction) through the pleated structure 26 and exhausts from the exhaust region (exhaust port E) as the nitrogen-enriched air in which oxygen as a particular gas selectively permeates through the gas separation membrane 29. The scavenging gas supplied from the supply region (supply port B) of the open region R2 moves along the pleat direction through the pleated structure 26 and exhausts from the exhaust region (exhaust port E) as the oxygen-enriched air which is accompanied by oxygen selectively permeating through the gas separation membrane 29.

Figure 9:
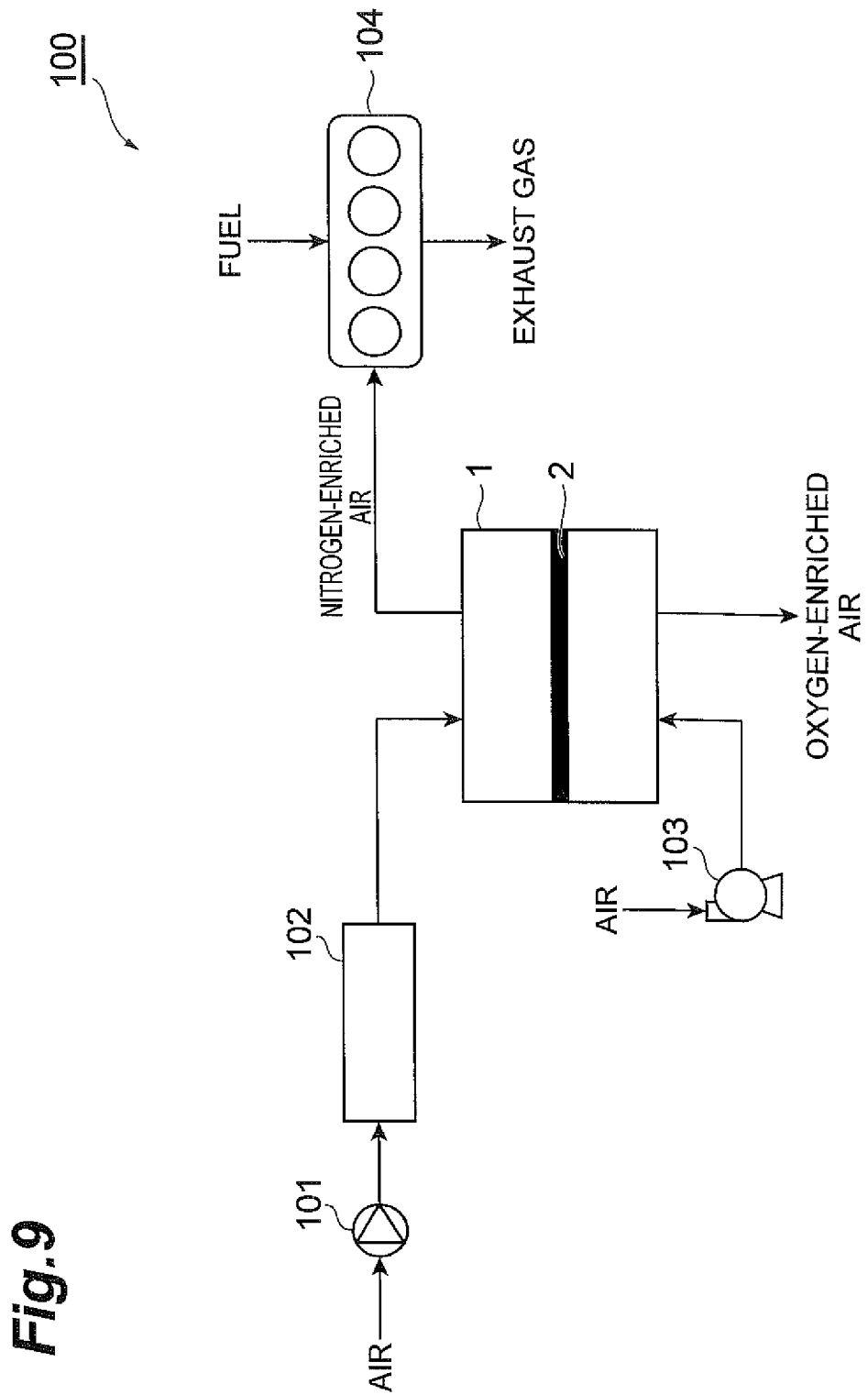
FIG. 9 is a schematic diagram showing a configuration of an internal combustion engine.

An internal combustion engine installed with the gas separation device 1 will now be described. FIG. 9 is a schematic diagram showing a configuration of an internal combustion engine. As shown in the figure, an internal combustion engine 100 is configured to include the gas separation device 1 installed with the membrane element 2, a compressor 101, a temperature controller 102, a pump 103, and a diesel engine 104. In the internal combustion engine 100, the air is introduced from the compressor 101 to the temperature controller 102, and the air having the temperature regulated in the temperature controller 102 is supplied to the gas separation device 1. Then, the nitrogen-enriched air in which oxygen is selectively permeated in the gas separation membrane 29 of the membrane element 2 of the gas separation device 1 is supplied to the diesel engine 104.

The air serving as a scavenging gas supplied from the pump 103 is introduced to the gas separation device 1 and is exhausted as the oxygen-enriched air accompanied by oxygen selectively permeating through the gas separation membrane 29 of the membrane element 2. The composition of supply gas to be supplied to the internal combustion engine may be adjusted by introducing water vapor, water, carbonic acid gas, or the like from the pump 103.

The effects and operation of the membrane element 2 and the gas separation device 1 installed with the membrane element 2 according to the present embodiment will now be described.

In the membrane element 2, the gasket 34 is arranged on the upper portion of the rigid member 32, and the elastic epoxy resin adhesive S is applied as the sealing portion on the lower portion of the rigid member 32. Because of such a configuration, the pressure applied to the gasket 34 can be received by the member, and the pressure can be applied uniformly to the elastic epoxy resin adhesive S by the rigid members 32, so that the supply side and the exhaust side of gas can be sealed more reliably in the open regions R1 and R2 of the pleated structure 26.

Then, while the rigid members 32 are in intimate contact with the open regions R1 and R2, force is exerted uniformly on the open regions R1 and R2 with a sufficient contact pressure (sealing pressure), thereby reliably sealing the supply side and the exhaust side of gas in the open regions R1 and R2 on both surface sides of the pleated structure 26. Thus, a shortcut of gas can be prevented more. As a result, the gas separation performance can be improved.

Furthermore, the rigid members 32 are adhesively fixed to the open regions R1 and R2 of the reinforcement frame 27 by the elastic epoxy resin adhesive S, so that the rigid members 32 are tightly fixed to the pleated structure 26. Accordingly, the supply region and the exhaust region can be separated from each other reliably, thereby preventing a shortcut of gas more reliably.

In addition, the force exerted on the rigid member 32 is transmitted more uniformly to the elastic epoxy resin adhesive S thereby preventing flection of the pleated structure 26. Thus, the sealability of the supply region and the exhaust region can be improved more. Since the flow path can be formed accurately, the pressure loss design of the flow path becomes easy, and the performance close to the theoretical performance can be pursued.

The areas of the supply port B (supply region) and the exhaust port E (exhaust region) of gas to/from the inside of the pleated structure 26 can be adjusted by the coated region with the elastic epoxy resin adhesive S for adhesively fixing the rigid member 32. Therefore, the amount of gas supply to the inside of the pleated structure 26 can be adjusted with a simple structure, and the sealability can be ensured. The area of the elastic epoxy resin adhesive S can be set to 5% to 95% of the open regions R1 and R2, whereby the areas of the supply region and the exhaust region can be optimized in gas separation.

In the membrane element 2, the gasket 34 rests on the rigid member 32. This rigid member 32 is supported in abutment with the reinforcement frame 27 in the direction intersecting the folds 31 of the pleated structure 26 in which the supply side and the exhaust side of gas are separated from each other. Since the rigid member 32 is arranged so as to be supported in abutment with the reinforcement frame 27, the rigidity of the rigid member 32 can be ensured. Then, the stress exerted on the rigid member 32 is not distributed to the pleated structure 26 but is distributed to the reinforcement frame 27, so that the rigidity of the membrane element 2 as a whole can be ensured. Therefore, when the supply region and the exhaust region are separated from each other, even if the rigid member 32 receives a force, it is supported by the reinforcement frame 27, thereby preventing distortion of the pleated structure 26 more. Thus, even more sufficient contact pressure can be ensured without deformation of the gas flow path. As a result, the gas separation performance of the membrane element 2 can be further improved.

In addition, the force applied to the gasket 34 and the force on the elastic epoxy resin adhesive S in close contact with the pleated structure 26 can be received by the rigid member 32, thereby preventing flection of the pleated structure 26. Therefore, a sufficient contact pressure can be ensured as compared with a configuration in which the gasket 34 is directly in abutment with the pleated structure 26.

The present embodiment includes the rib portions 33a and 33b that extend along the longitudinal direction of the rigid member 32 and are provided upright on the rigid member 32 in the height direction of the pleated structure 26. In this manner, the provision of the rib portions 33a and 33b along the rigid member 32 can prevent flection of the rigid member 32. As a result, flection of the pleated structure 26 can be further prevented. Therefore, a more sufficient contact pressure can be ensured, thereby preventing a shortcut more.

Figure 10:
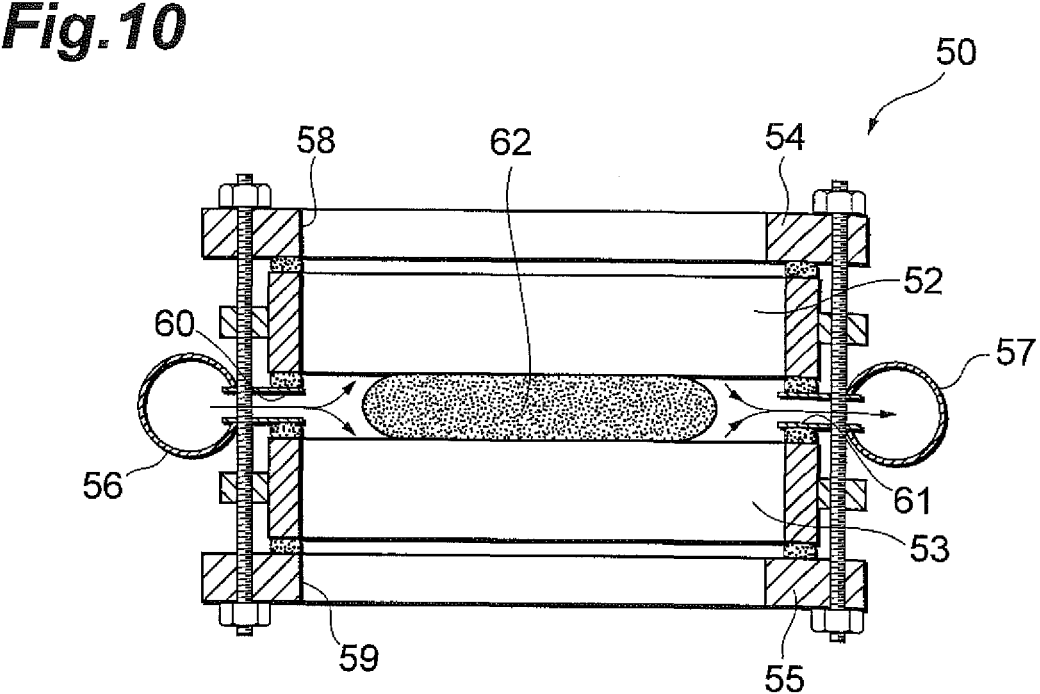
FIG. 10 is a cross-sectional view showing a configuration of a conventional gas separation device.

FIG. 10 is a cross-sectional view of a conventional gas separation device. As shown in FIG. 10, a conventional gas separation device 50 is configured to include two membrane elements 52 and 53 with their top surfaces facing each other, a pair of pressure plates 54 and 55 sandwiching the two membrane elements 52 and 53 from the bottom surface side, pipes 56 and 57 supplying or exhausting a gas mixture to the top surface primary side of the membrane elements 52 and 53, and secondary-side flow paths 58 and 59 for discharging the gas transmitted through and exhausted from the gas separation membranes of the membrane elements 52 and 53. Flow path control means 62 separates the supply region from the exhaust region.

In this gas separation device 50, a gas mixture flowing through the supply-side pipe 56 is supplied to the primary side of the membrane elements 52 and 53, and when a gas mixture flowing through the primary-side regions of the membrane elements 52 and 53 is exhausted to the exhaust-side pipe 57, the gas mixture has to pass through slit-like narrow passages 60 and 61. Thus, a constricting flow and a diffusing flow may be produced, and the pressure loss may be increased. Furthermore, when the gas mixture flowing through the supply-side pipe 56 is supplied to the primary side of the membrane elements 52 and 53, and when the gas mixture flowing through the primary-side regions of the membrane elements 52 and 53 is exhausted to the exhaust-side pipe 57, a vortex flow may be produced since the path through which the gas mixture flows is bent. Therefore, the pressure loss is likely to increase, which is likely to lead to reduction of gas separation and condensing efficiency.

In addition, in the gas separation device 50, the flow path control means (sponge portion) 62 is in mechanical contact with the pleated structure. Therefore, part of the gas introduced from the supply-side pipe 56 makes a shortcut (short circuit) between the pleated structure and the flow path control means 62. Accordingly, the gas separation performance is impaired.

Furthermore, the flow path control means 62 is reduced in mechanical strength over long-term use, and the sealability is thus deteriorated. Therefore, the gas separation performance is reduced over time. In addition, the stress from the flow path control means 62 to the pleated structure deforms the pleats, so that the pressure loss at the entrance or inside of the pleats is increased while the gas separation performance is reduced.

By contrast, in the gas separation device 1, the primary-side passage P1 and the secondary-side passage P2 are arranged to be opposed each other so as to sandwich the membrane element 2. With such a configuration, the primary-side communication portion L1 through which the gas mixture flowing through the primary-side passage P1 passes when being supplied to the primary side of the membrane element 2 is formed in a shape corresponding to the shape of the primary-side passage P1. The secondary-side communication portion L2 through which the particular gas and the scavenging gas exhausted from the secondary side of the membrane element 2 passes when being exhausted to the secondary-side passage P2 is also formed in a shape corresponding to the secondary-side passage P2.

Therefore, when compared with the conventional configuration in which the pipes 56 and 57 for supplying a gas mixture are arranged on the left and right of the two membrane elements 52 and 53 arranged above and below, that is, a configuration in which gas passes through the narrow passages 60 and 61 in a bent manner to be supplied to the membrane elements 52 and 53 or exhausted from the membrane elements 52 and 53, it is possible to suppress a constricting flow, an extending flow, and a vortex flow during passage through the primary-side communication portion L1 and the secondary-side communication portion L2. As a result, reduction of pressure loss and improvement of gas separation performance can be achieved.

In the gas separation device 1, the ratio in width of the primary-side communication portion L1 and the secondary-side communication portion L2 to the open regions R1 and R2 of the membrane element 2 can be designed freely. However, in the conventional gas separation device 50 shown in FIG. 10, the passage 60 is narrower than the supply region of the membrane element 52, and the passage 61 is narrower than the exhaust region of the membrane element 52. In other words, in the conventional gas separation device, the diameter of the communication portion on the supply side (or the exhaust side) is narrower than the supply region (or the exhaust region) of the membrane element, so that a pressure loss easily occurs. By contrast, the gas separation device 1 of the present invention with the configuration described above can reduce a pressure loss as compared with the conventional gas separation device 50. Accordingly, the gas separation/condensing efficiency can be improved.

In the conventional gas separation device 50 shown in FIG. 10, the pipes 56 and 57 for supplying or exhausting the gas mixture are provided to protrude toward the left and right of the membrane elements 52 and 53. Accordingly, the size in the width direction is increased, and unnecessary spaces are formed in gaps between the pipes 56 and 57 and the membrane elements 52 and 53. Therefore, for example, in an engine room in which the gas separation device 50 is arranged, it is necessary to reserve a space for the protrusion of the pipes 56 and 57. By contrast, the gas separation device 1 employs a configuration in which the primary-side passage P1 and the secondary-side passage P2 are arranged to be opposed to each other so as to sandwich the membrane element 2. Therefore, the pipes 56 and 57 for supplying the gas mixture do not protrude to the left and right of the membrane elements 52 and 53 as in the conventional gas separation device 50, so that the primary-side passage P1 and the secondary-side passage P2 can be contained within the size in the width direction of the membrane element 2. Therefore, a size reduction (reduction in volume) can be achieved with a pressure loss being reduced. Thus, the arrangement in a limited engine space in a ship or the like becomes possible.

In the present embodiment, the primary-side supply portions K1 are sandwiched between the pair of membrane elements 2 arranged such that the primary sides thereof face each other. The pair of secondary-side exhaust portions K2 are provided on the secondary sides of the pair of membrane elements 2 such that the secondary-side passages P2 are arranged to be opposed to the primary-side passages P1. Accordingly, with the primary-side supply portions K1 at the center, the membrane elements 2 and the secondary-side exhaust portions K2 are each arranged in this order. In other words, the gas mixture introduced to the primary-side supply portions K1 are subjected to separation/condensation through the two membrane elements 2. Therefore, the efficiency of gas separation/condensation can be improved.

The internal diameter of the primary-side passage P1 is approximately equal to the inner diameters of the intake pipe 14 and the exhaust pipe 15 at the primary-side passage P1. Therefore, when a gas mixture is introduced from the intake pipe 14 to the primary-side passage P1 and when a gas mixture is exhausted from the exhaust pipe 15 after a particular gas is separated, a constricting flow or a diffusing flow can be suppressed. Therefore, a pressure loss can be further reduced.

The gas separation device 1 employs a configuration in which the primary-side passage P1 and the secondary-side passage P2 are arranged to be opposed to each other so as to sandwich the membrane element 2. Therefore, the pipes for supplying a gas mixture do not protrude to the left and right to the membrane elements as in the conventional gas separation device, and the primary-side passage P1 and the secondary-side passage P2 can be contained within the size in the width direction of the membrane element.

In the conventional gas separation device, when the opening of the slit-like passage is formed to be large in order to suppress a constricting flow and a diffusing flow and to achieve a reduction in pressure loss equivalent to that of the gas separation device of the present invention, the size in the height direction is increased. By contrast, in the gas separation device 1, size reduction can be achieved while a pressure loss is reduced.

Second Embodiment

Figure 11:
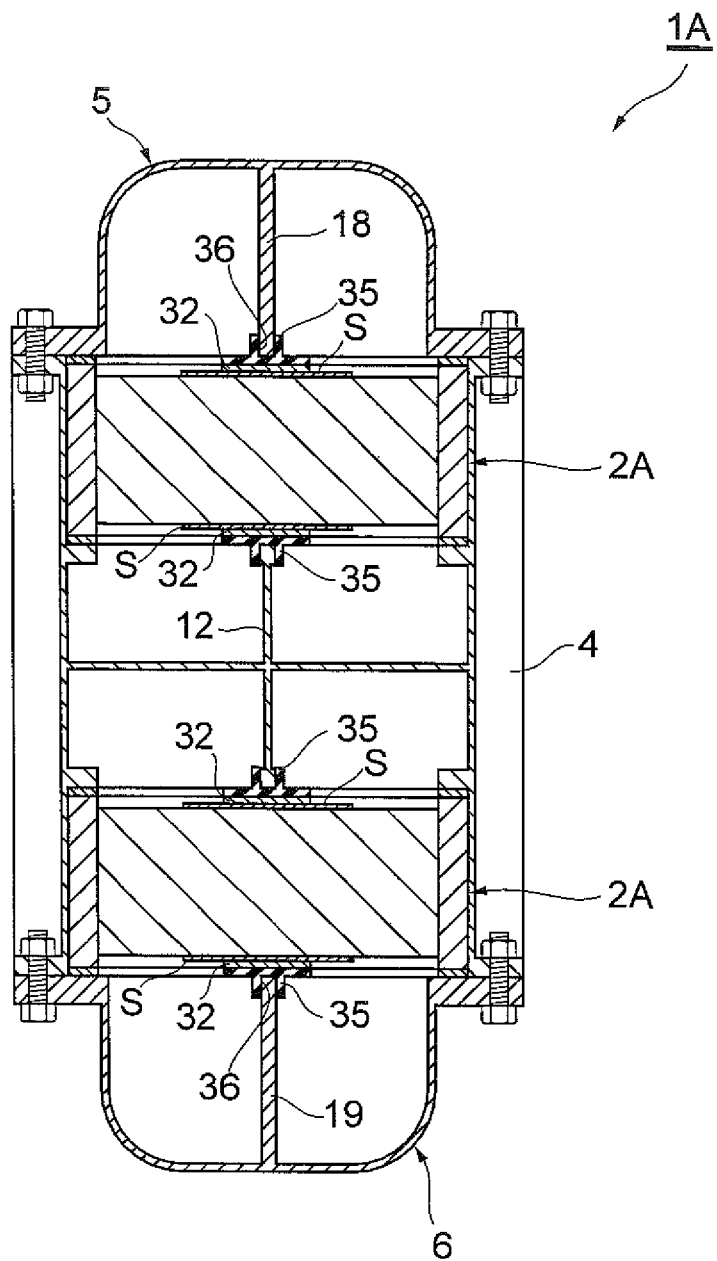
FIG. 11 is a cross-sectional view of a gas separation device provided with membrane elements according to a second embodiment of the present invention.

A membrane element according to a second embodiment will now be described. FIG. 11 is a cross-sectional view of a gas separation device installed with membrane elements according to the second embodiment. As shown in FIG. 11, membrane elements 2A installed in a gas separation device 1A differ from the first embodiment in the shape of gaskets 35.

Specifically, as shown in FIG. 11, the gasket 35 in the membrane element 2A is depressed in cross section. The gasket 35 rests on the rigid member 32 and has a groove 36 provided along the longitudinal direction. The width size of the groove 36 of the gasket 35 is equivalent to the width size of the partition portion 12 of the body portion 4 and the partition portions 18 and 19 of the cover portions 5 and 6.

Thus, the partition portion 12 of the body portion 4 and the partition portions 18 and 19 of the cover portions 5 and 6 are inserted in intimate contact in the groove s 36 of the gaskets 35.

In the membrane element 2A having such a configuration, the gasket 35 rests on the rigid member 32, and the elastic epoxy resin adhesive S is provided between the rigid member 32 and the pleated structure 26, in a similar way to the membrane element 2 in the first embodiment. Accordingly, the supply side (upstream side) and the exhaust side (downstream side) of gas in the open regions R1 and R2 on the both surface sides of the pleated structure 26 can be sealed reliably, thereby preventing a shortcut of gas. As a result, the gas separation performance can be improved.

Third Embodiment

Figure 12:
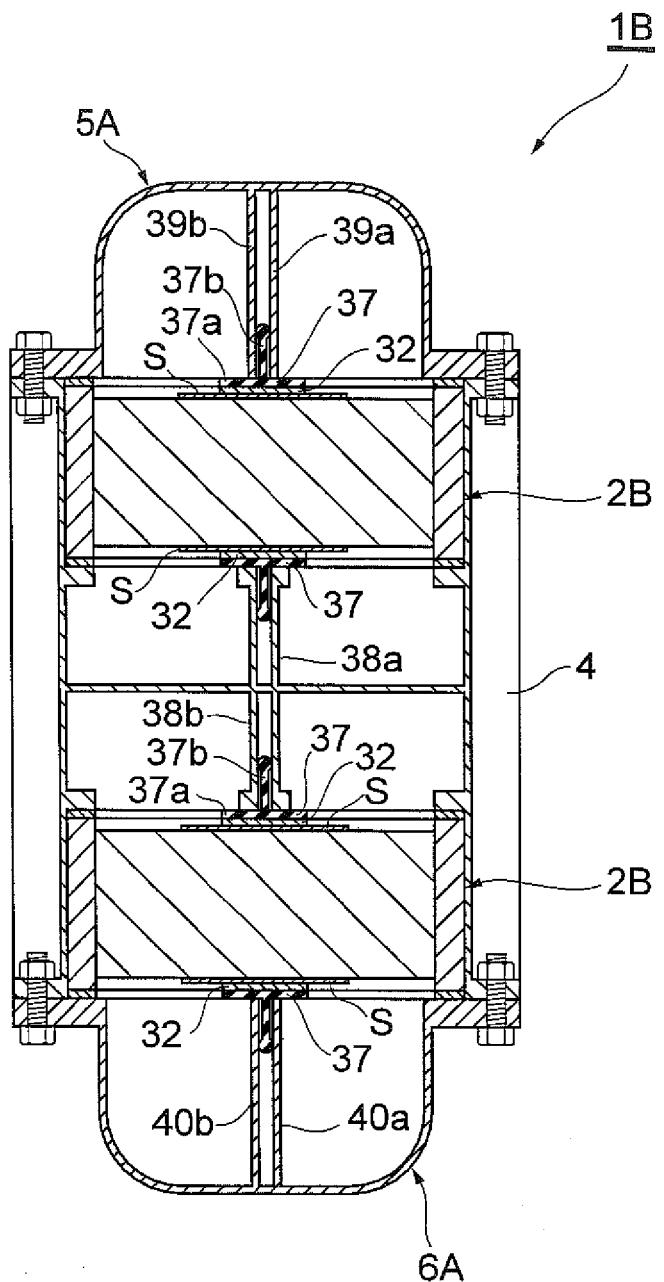
FIG. 12 is a cross-sectional view of a gas separation device provided with membrane elements according to a third embodiment of the present invention.

A membrane element according to a third embodiment will now be described. FIG. 12 is a cross-sectional view of a gas separation device installed with membrane elements according to the third embodiment. As shown in FIG. 12, membrane elements 2B of the third embodiment installed in a gas separation device 1B differ from the first and second embodiments in the shape of gaskets 37.

Specifically, as shown in FIG. 12, the gasket 37 in the membrane element 2B is T-shaped in cross section. The gasket 37 is configured with a rest portion 37a resting on the rigid member 32 and an upright portion 37b provided upright on the rest portion 37a. Then, the tip end portion of the upright portion 37b has the width size increasing upward from the rest portion 37a.

In connection with the gaskets 37 in this manner, partition portions 38a, 38b, 39a, 39b, 40a, and 40b corresponding to the gaskets 37 are provided in a body portion 4A and cover portions 5A and 6A. Specifically, the pair of partition portions 38a and 38b are provided in the direction intersecting the dividing plate 8 in the body portion 4A. The distance between the pair of partition portions 38a and 38b is equivalent to the width size of the tip end portion of the upright portion 37b of the gasket 34. Similarly, the pairs of partition portions 39a and 39b, and 40a and 40b are provided in the inside of the cover portions 5A and 6A. The distance between the partition portions 39a and 39b and the distance between the partition portions 40a and 40b are equivalent to the width size of the tip end portion of the upright portion 37b of the gasket 34. Therefore, the gaskets 37 are in intimate contact with the partition portions 38a, 38b, 39a, 39b, 40a, and 40b.

In the membrane element 2B having such a configuration, the gasket 37 rests on the rigid member 32, and the elastic epoxy resin adhesive S is provided between the rigid member 32 and the pleated structure 26, in a similar way to the membrane element 2 in the first embodiment. Accordingly, the supply side (upstream side) and the exhaust side (downstream side) of gas in the open regions R1 and R2 on the both surface sides of the pleated structure 26 can be sealed reliably, thereby preventing a shortcut of gas. As a result, the gas separation performance can be improved.

It should be noted that the present invention is not limited to the foregoing embodiments. For example, in the foregoing embodiment, in the gas separation device 1, the membrane elements 2 are accommodated in the housing 3 having the pair of cover portions 5 and 6 provided above and below the body portion 4. However, the housing accommodating the membrane elements 2 may have a configuration as shown in FIG. 13, for example.

Figure 13:
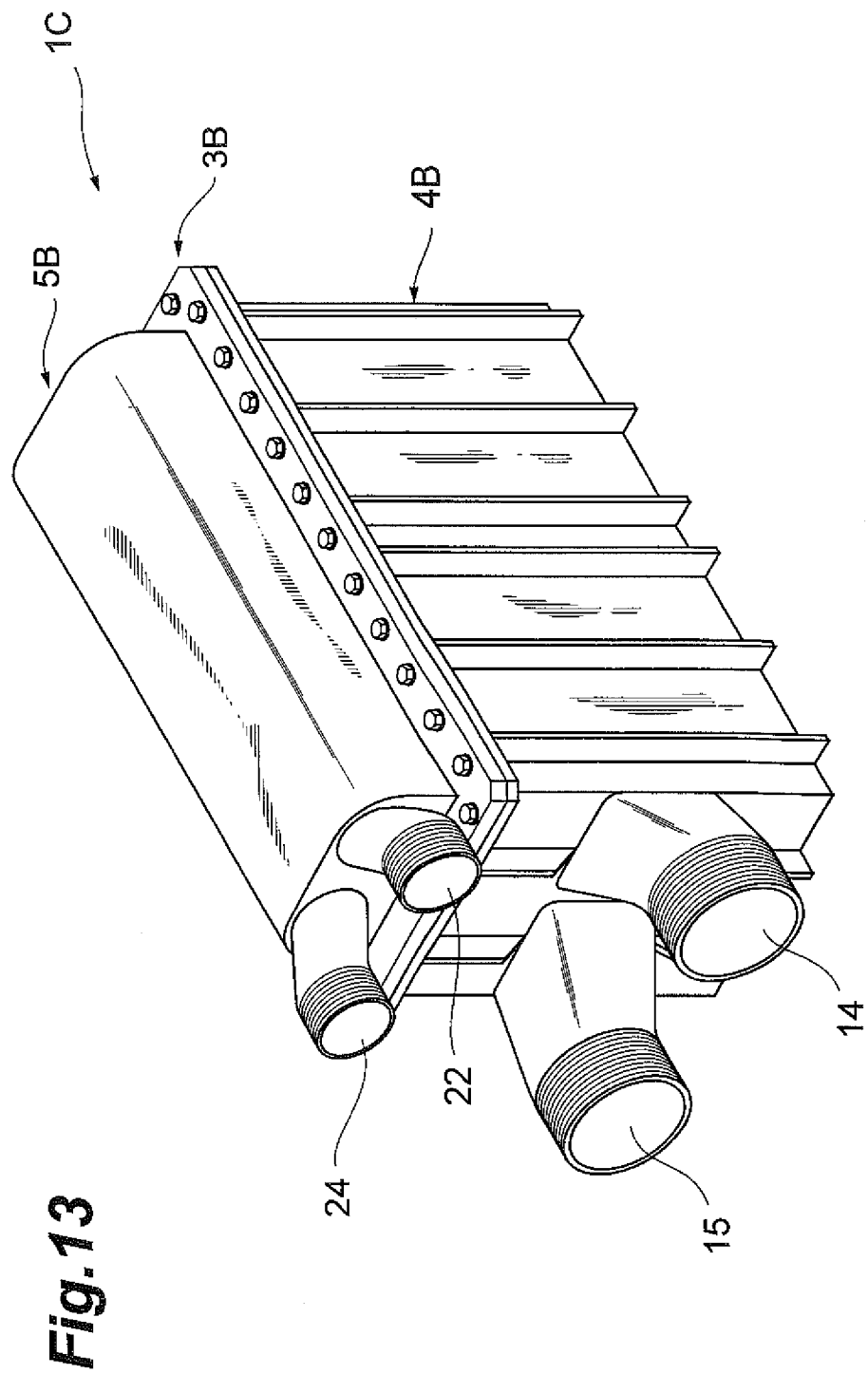
FIG. 13 is a perspective view showing an external view of a gas separation device according to a modification.

FIG. 13 is a perspective view showing an external view of a gas separation device according to a modification. As shown in FIG. 13, a housing 3B in a gas separation device 1C is configured with a body portion 4B and a cover portion 5B. More specifically, in the gas separation device 1 in the foregoing embodiment, the two membrane elements 2 are arranged to sandwich the primary-side passages P1 therebetween, and the secondary-side passages P2 are arranged to be opposed to each other in the upward and downward direction therefrom. In the gas separation device 1, the membrane elements (not shown) are arranged in the body portion 4B in which the primary-side passage is formed, and the cover portion 5B in which the secondary-side passage is formed is arranged on the upper portion of the body portion 4B. Thus, the gas separation device 1C is reduced in the height direction as compared with the gas separation device 1. The configuration of the body portion 4B, the cover portion 5B, the primary-side passage, the secondary-side passage, and the membrane element is similar to the configuration of the foregoing embodiments. The gas separation device 50 also achieves the effects and operation similar to those in the gas separation device 1.

In the foregoing embodiments, the intake pipe 14 and the exhaust pipe 15 are arranged side by side in the body portion 4. However, the attachment position of the intake pipe 14 and the exhaust pipe 15 is not limited thereto. For example, a configuration as shown in FIG. 14 may be employed.

Figure 14:
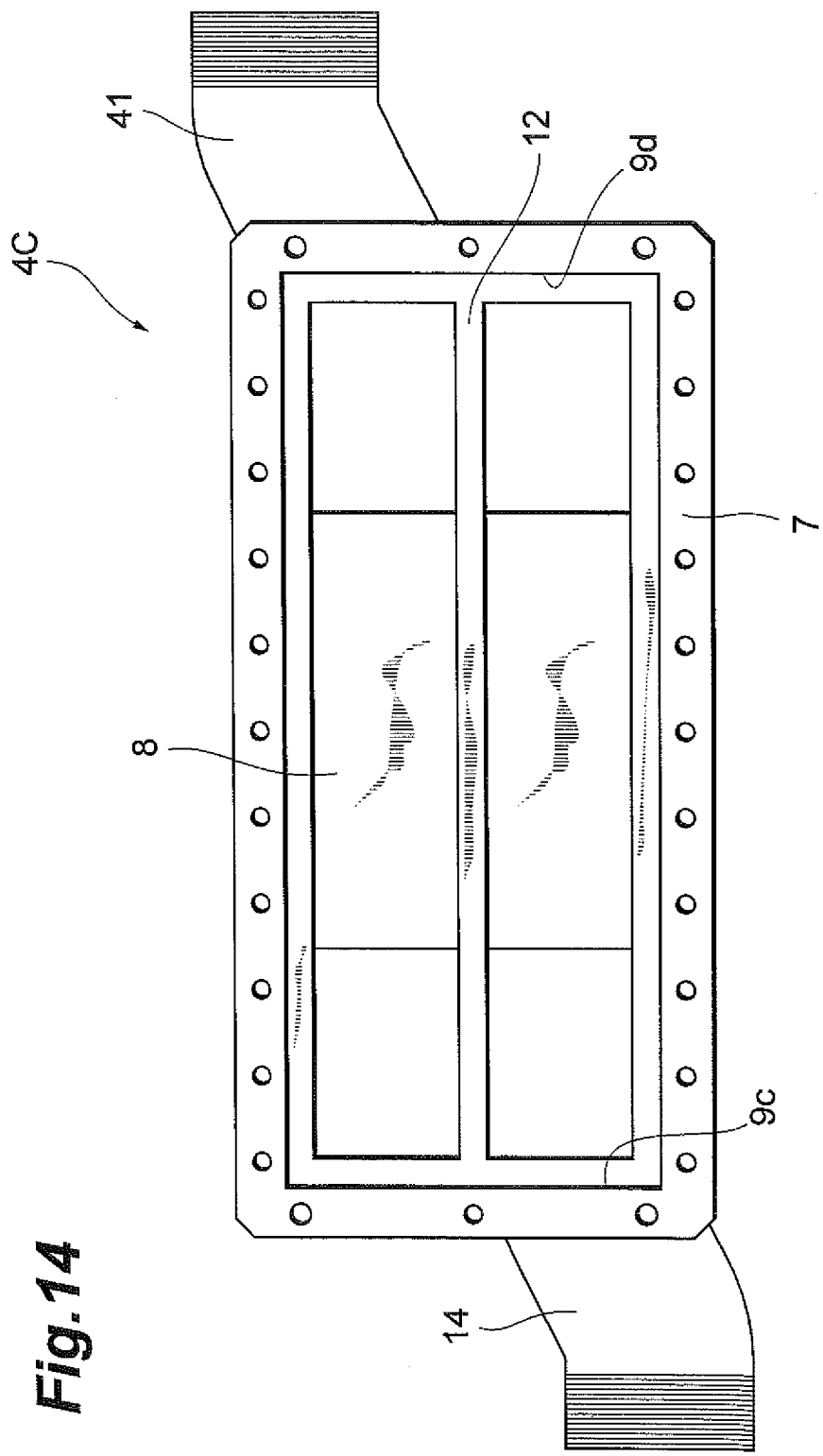
FIG. 14 is a top view of a body portion according to a modification.

FIG. 14 is a top view of a body portion according to a modification. As shown in FIG. 14, in a body portion 4C, the intake pipe 14 is provided on the inner wall 9c side of the body portion 4C, and an exhaust pipe 41 is provided on the inner wall 9d side of the body portion 4C. More specifically, the intake pipe 14 and the exhaust pipe 41 are provided in the body portion 4C such that their openings face in the directions opposite to each other in the longitudinal direction of the body portion 4C.

In the foregoing embodiments, the intake pipes 22 and 23 and the exhaust pipes 24 and 25 are arranged side by side in the cover portions 5 and 6. However, the attachment position of the intake pipes 22 and 23 and the exhaust pipes 24 and 25 is not limited thereto. For example, a configuration as shown in FIG. 15 may be employed.

Figure 15:
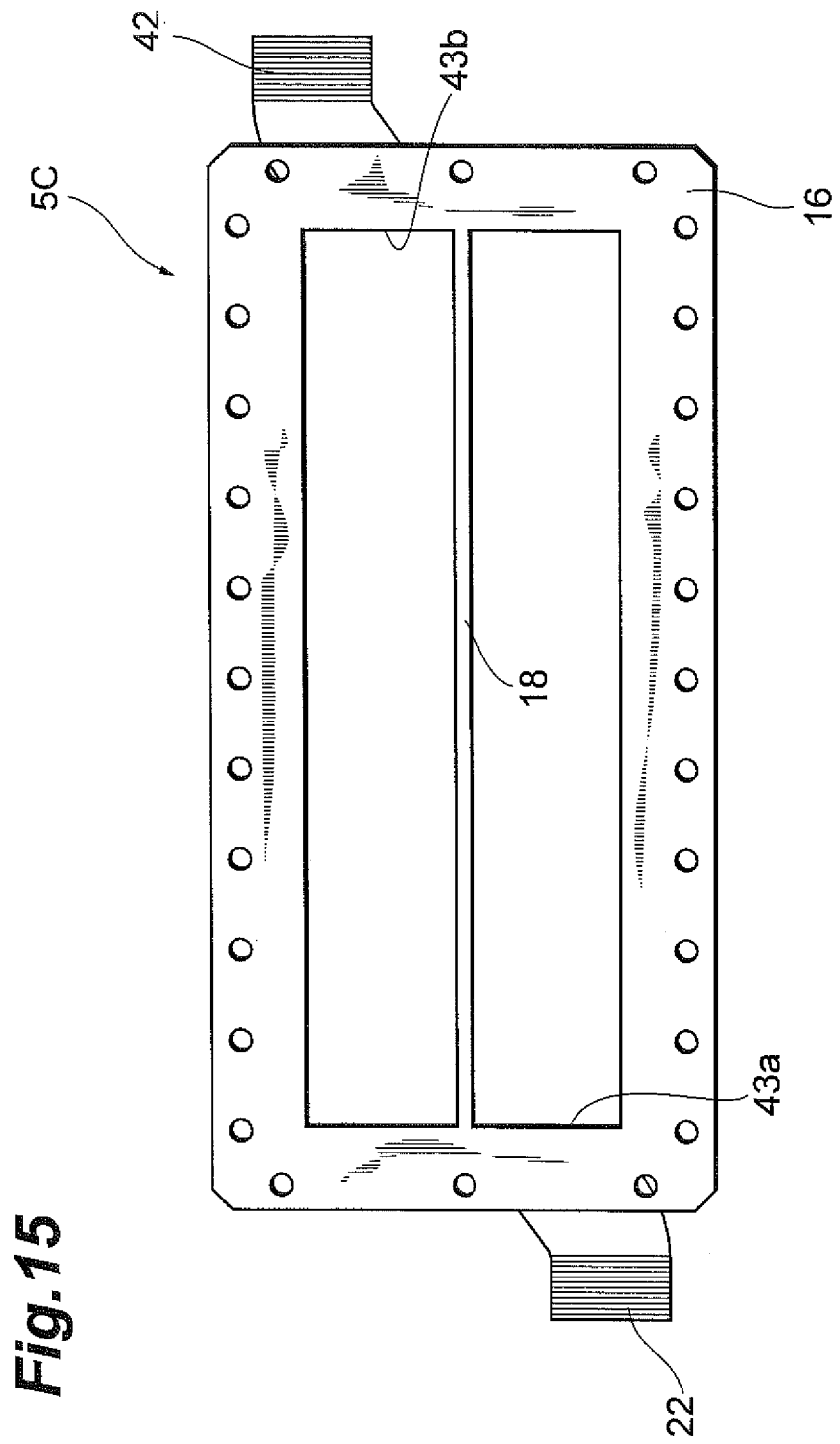
FIG. 15 is a top view of a cover portion according to a modification.

FIG. 15 is a top view of a cover portion according to a modification. As shown in FIG. 15, in a cover portion 5C, the intake pipe 22 is provided on the inner wall 43a side of the cover portion 5C, and an exhaust pipe 42 is provided on the inner wall 43b side of the cover portion 5C. More specifically, the intake pipe 22 and the exhaust pipe 42 are provided in the cover portion 5C such that their openings face in the directions opposite to each other in the longitudinal direction of the cover portion 5C.

The gas separation device having the configuration described above achieves the effects and operation similar to those in the gas separation device 1, except that it differs from the gas separation device 1 only in the direction in which the gas mixture is exhausted after a particular gas (oxygen) exhausted from the exhaust pipe is separated, and in the direction in which the scavenging gas accompanied by the particular gas exhausted from the exhaust pipe is exhausted. The configuration as described above can be modified as appropriate according to the shape of an engine room, for example, in which the gas separation device is arranged.

An O-ring may be used as the gasket. More specifically, any gasket may be used as long as it separates the supply side and the exhaust side of gas from each other in the open regions R1 and R2 of the reinforcement frame 27 to form passages passing through the inside of the pleated structure 26.

In the foregoing embodiments, the rigid member 32, the gasket 34, and the elastic epoxy resin adhesive S as the sealing portion are provided separately from each other. However, the gasket 34 and the elastic epoxy resin adhesive S may be tightly integrated with the rigid member 32.

In the foregoing embodiments, the gas separation device 1 exhausts the nitrogen-enriched air by allowing the air as a gas mixture to pass through the gas separation membrane 29 in the pleated structure 26 of the membrane element 2 and by allowing oxygen as a particular gas to selectively pass through, and exhausts the oxygen-enriched air by supplying the scavenging gas. However, the gas separation device 1 may be used as a humidifier. Specifically, for example, with the primary side of the membrane element 2 serving as a wet-side flow path and the secondary side thereof serving as a dry-side flow path, water vapor is passed through the membrane element 2, thereby humidifying and dehumidifying a gas.

Figure 16:
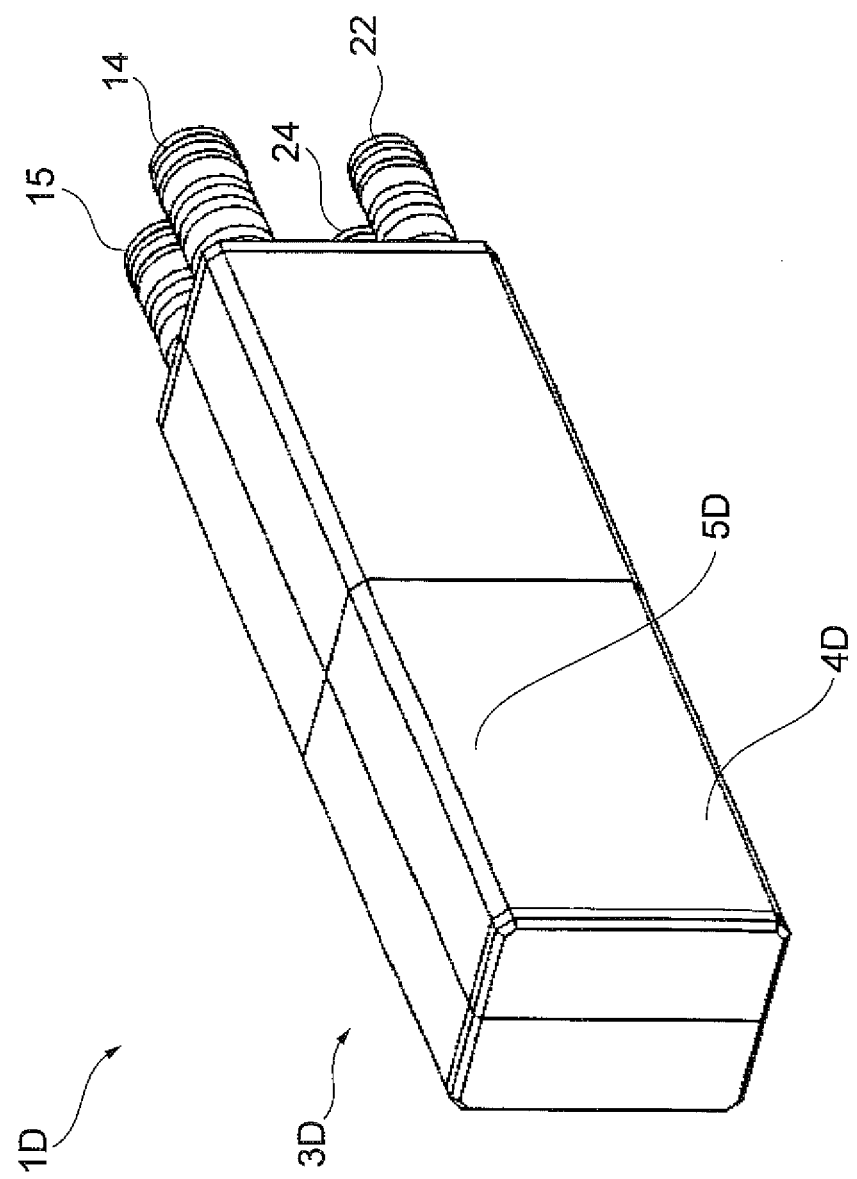
FIG. 16 is a perspective view showing an external view of a gas separation device according to a modification.
Figure 17:
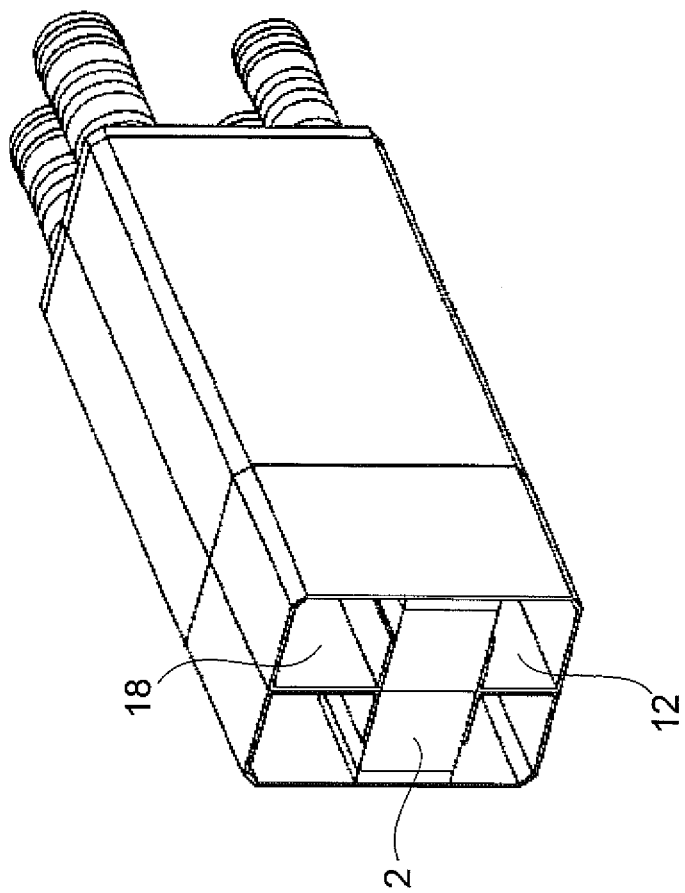
FIG. 17 is a cross-sectional perspective view of the gas separation device shown in FIG. 16.

FIG. 16 is a perspective view showing an external view of a gas separation device according to a modification. FIG. 17 is a cross-sectional perspective view of the gas separation device shown in FIG. 16, and FIG. 18 is an exploded perspective view of the gas separation device shown in FIG. 16.

As shown in FIG. 16 and FIG. 17, in a gas separation device 1D, a body portion 4D is bonded to a cover portion 5D to integrally form a housing 3D. Then, as shown in FIG. 18, the rigid member 32 has a groove and is bonded to or fused with the partition portion of the cover portion 5D or the body portion 4D. This eliminates the need for a gasket. With such a configuration, a compact gas separation device can be implemented.

Figure 18:
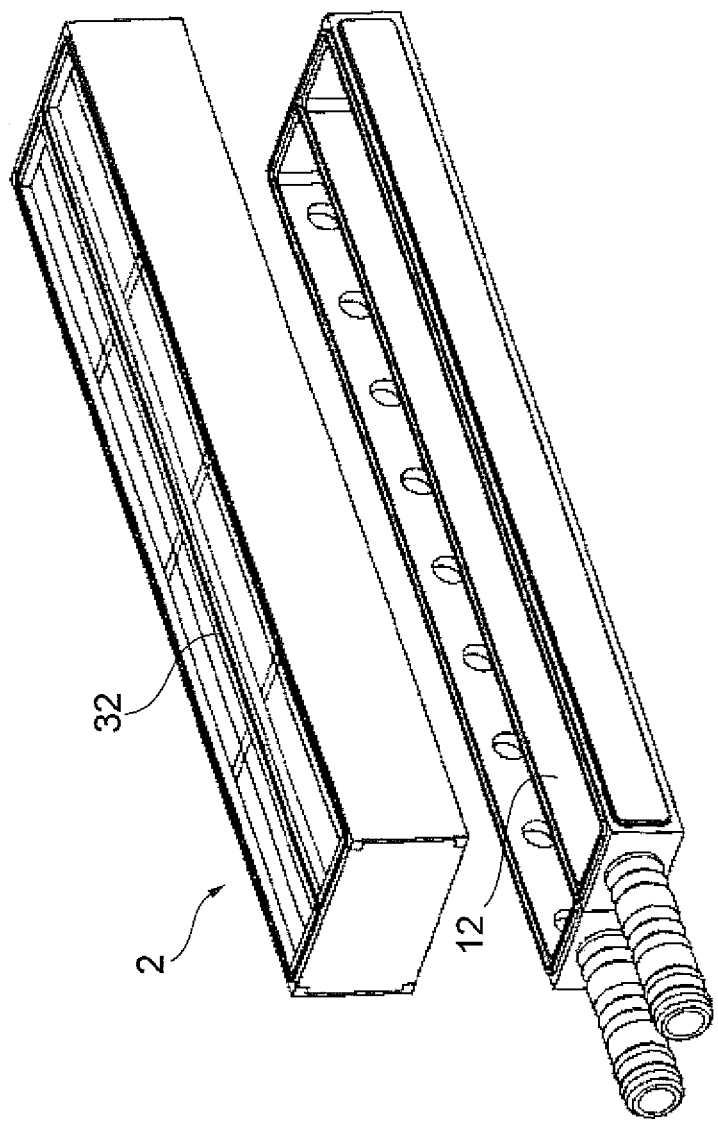
FIG. 18 is an exploded perspective view of the gas separation device shown in FIG. 16.
Figure 19:
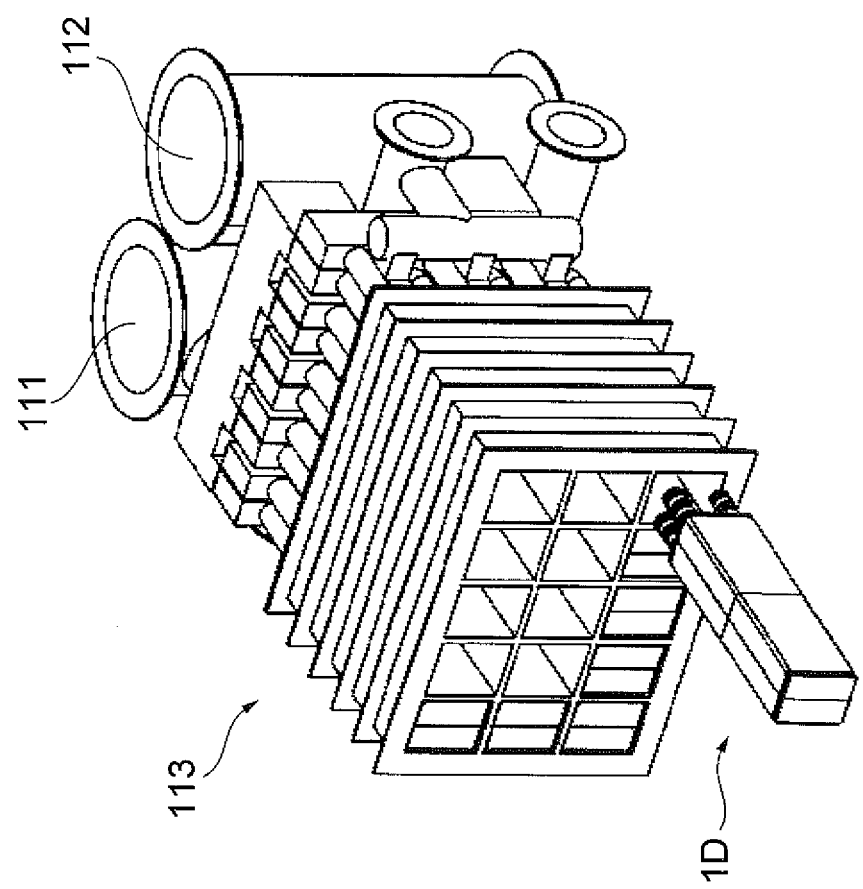
FIG. 19 is a perspective view showing an external view of a gas separation system.

The gas separation device 1D shown in FIG. 16 to FIG. 18 can be incorporated into a gas separation system 113 shown in FIG. 19. In the gas separation system 113 shown in FIG. 19, gas separation is performed by introducing a gas from a supply pipe 111 to the intake pipe of each gas separation device 1D. Then, the gas exhausted from the exhaust pipe of each gas separation device 1D is sent to an exhaust pipe 112.

This gas separation system 113 is suitable when a large amount of gas is subjected to gas separation. For example, it is suitable for gas separation performed to supply the nitrogen-enriched air to a large diesel engine of a ship or the like.

In the gas separation system 113, replacement of the gas separation device 1D is easy. The intake pipe and the exhaust pipe of the gas separation device 1D serve as female (male) couplers while the gas separation device has male (female) couplers, thereby facilitating attachment and removable with a single operation.

In general, when gas separation is performed, the inside of the gas separation device (inside the housing) is pressurized, and the housing is thus expanded. In the gas separation system 113, the gas separation device 1D is inserted in a frame, so that the expansion of the gas separation device 1D can be suppressed by the frame. Therefore, the housing may not be formed of a robust member but may be produced from a soft member.

EXAMPLES

The embodiment of the present invention will be described more specifically by illustrating examples and a comparative example. The embodiment is not limited to the examples below as long as not departing from the spirit of the invention.

Example 1

Figure 20:
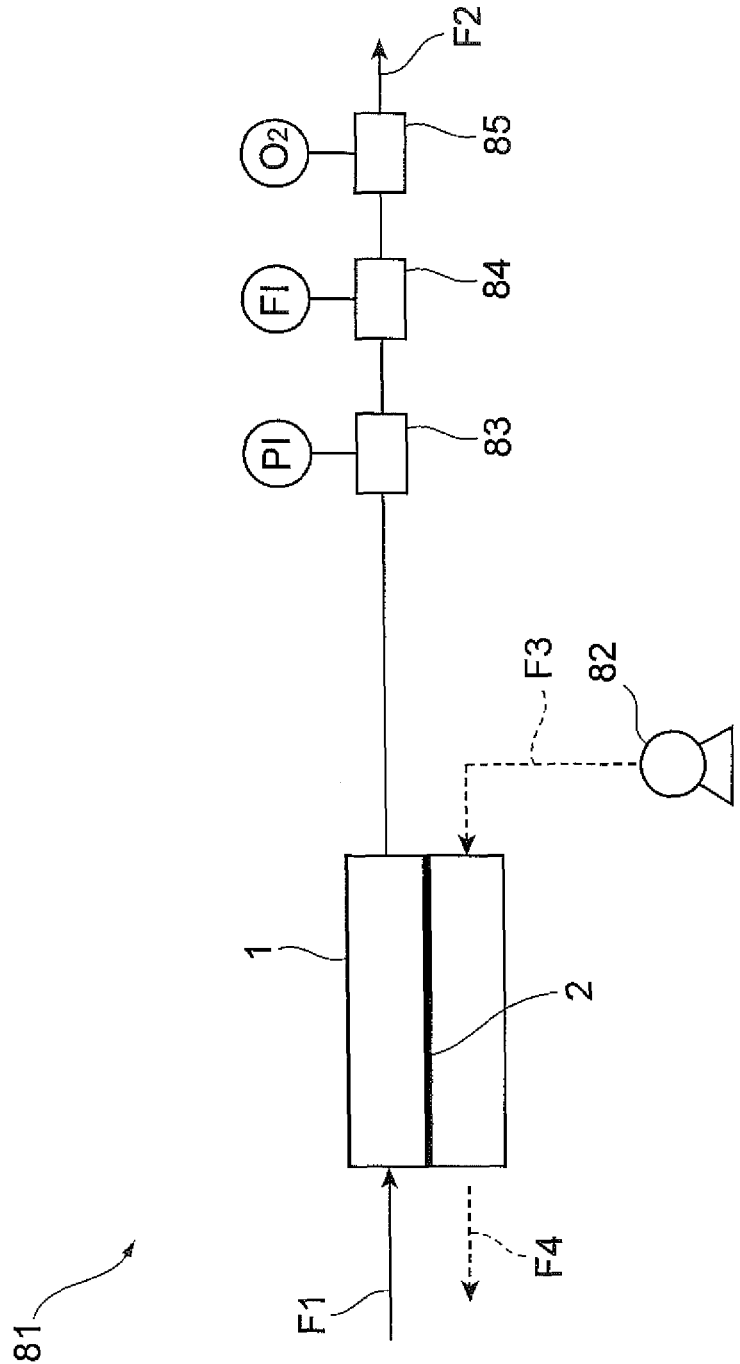
FIG. 20 is a schematic diagram showing a configuration of the gas separation system.

A gas separation system 81 shown in FIG. 20 was operated to generate the nitrogen-enriched air from the air. The gas separation system 81 shown in FIG. 20 has the gas separation device 1 installed with the membrane element 2. The gas separation device shown in FIG. 13 was used as the gas separation device 1.

First, a method of operating the gas separation system 81 will be described. Air F1 introduced from the intake pipe of the gas separation device 1 passes through the supply side of the membrane element 2 to reach the exhaust side and is exhausted from the exhaust pipe of the gas separation device 1. Then, while the air passes through the membrane element 2, gas separation is performed, so that oxygen diffusing and permeating to the opposite side of the gas separation membrane. Then, nitrogen-enriched air F2, which is the air in which oxygen is reduced, is exhausted from the exhaust pipe of the gas separation device 1.

Air F3 introduced from the intake pipe for the scavenging gas is accompanied by oxygen permeating and diffusing through the gas separation membrane and is exhausted as oxygen-enriched air F4 from the exhaust pipe for the scavenging gas. The scavenging gas is supplied from a pump 82 to the intake pipe for the scavenging gas.

The membrane element will now be described. The membrane element 2 shown in FIG. 4 was used as the membrane element 2.

As the gas separation membrane, a 90 μm-thick flat membrane serving as the support layer in which a polyethersulfone microporous membrane was formed on a non-woven fabric was coated with a fluoropolymer "Teflon® AF1600" (manufactured by DuPont). A plain-woven spacer formed of intersection fused-type polyester multifilament was used as the breathable reinforcement material (see FIG. 7). The gas separation membrane was sandwiched between the breathable reinforcement materials and pleated by a pleating device.

The pleated structure of the gas separation membrane was surrounded with a polycarbonate reinforcement frame and sealed with epoxy resin by a centrifugal method. Then, the membrane element was fabricated using the elastic epoxy resin adhesive as the sealing portion and using epoxy resin as the rigid member. Ribs were set up on the rigid member, and an O-ring was placed as a gasket on the rigid member and the reinforcement frame. The membrane element was thus fabricated.

The evaluation of the gas separation performance of the gas separation device will now be described. The pressure, flow rate, and oxygen concentration of the nitrogen-enriched air exhausted from the exhaust pipe of the gas separation device 1 were measured using a pressure gauge 83, a flow meter 84, and an oxygen analyzer 85, respectively. JKO-25LJII manufactured by JIKCO Ltd. was used as the oxygen analyzer 85. The air introduced to the gas separation device has an oxygen concentration of 20.9% with 200 kPaG (gauge pressure) at the room temperature. The result is shown in Table 1.

Example 2

A membrane element was fabricated in a similar manner as Example 1 except that a 20 μm-thick flat membrane in which a poly-a-olefin-based microporous membrane was formed on a non-woven fabric was used as the support layer of the gas separation membrane. The result is shown in Table 1.

Comparative Example 1

Operation was conducted under the same conditions as Example 1 except that the gas separation device 50 shown in FIG. 10 was used as the gas separation device. The result is shown in Table 1.

In the gas separation device shown in FIG. 10, the pleated structure having the same gas separation membrane as Example 1 was used. A urethane, closed-cell foam sponge was used as the flow path control means 62 (see FIG. 10).

TABLE 1

|  | Oxygen concentration (%) | Supply pressure (kPa · G) | Exhaust pressure (kPa · G) |
|---|---|---|---|
| Example 1 | 19.2 | 200 | 195 |
| Example 2 | 19.2 | 200 | 195 |
| Comparative Example 1 | 20.2 | 200 | 180 |

In Comparative Example 1 when compared with Example 1, the yield of the nitrogen-enriched air was reduced, and the oxygen concentration in the nitrogen-enriched air was not decreased. In addition, in Comparative Example 1 when compared with Example 1, the pressure loss was great.

REFERENCE SIGNS LIST

1 gas separation device, 2 membrane element, 26 pleated structure, 27 reinforcement frame, 32 rigid member, 33a, 33b rib portion (rib), B supply port (supply region), F virtual plane, E exhaust port (exhaust region), R1, R2 open region, S elastic epoxy resin adhesive (sealing portion).

The invention claimed is:

1. A membrane element comprising:
   a pleated structure formed by folding a gas separation membrane substrate;
   a reinforcement frame surrounding the pleated structure with both surface sides of the pleated structure being opened;
   a rigid member arranged in a direction intersecting a fold of the pleated structure in at least one of opened regions of the pleated structure surrounded by the reinforcement frame; and
   a sealing portion provided between the rigid member and the pleated structure,
   wherein the opened region is separated into a supply region and an exhaust region of gas by the sealing portion, and
   the sealing portion and top and/or bottom surface side of the pleated structure surround and form a gas flow path from the supply region to the exhaust region.

2. The membrane element according to claim 1, wherein the sealing portion is an adhesive or sealing agent.

3. The membrane element according to claim 1, wherein assuming a virtual plane on which apexes of a plurality of folds are arranged in the opened region of the pleated structure, the sealing portion is provided along the virtual plane.

4. The membrane element according to claim 3, wherein the sealing portion is provided in a plane along the virtual plane.

5. The membrane element according to claim 1, wherein
   the sealing portion is provided to extend from the rigid member toward the reinforcement frame in a fold direction of the pleated structure, and
   the supply region and the exhaust region are defined by the reinforcement frame and the sealing portion in the direction intersecting the fold on the both surface sides of the pleated structure being opened.

6. The membrane element according to claim 1, wherein the sealing portion covers 5% to 95% of the top of the opened region.

7. The membrane element according to claim 1, wherein the rigid member is fixed to the reinforcement frame.

8. The membrane element according to claim 1, further comprising a rib that extends in a longitudinal direction of the rigid member and is provided upright on the rigid member in a height direction of the pleated structure.

9. The membrane element according to claim 1, wherein
   the rigid member and the sealing portion are provided in both of the opened regions of the pleated structure surrounded by the reinforcement frame.

10. A gas separation device comprising the membrane element of claim 1.

11. An internal combustion engine comprising the gas separation device of claim 10.

12. The membrane element according to claim 1, wherein the sealing portion is an adhesive.

13. The membrane element according to claim 1, wherein the gas separation membrane substrate is a sheet.

14. The membrane element according to claim 1, wherein the sealing portion conforms to the surface of the rigid member.

15. The membrane element according to claim 1, wherein the sealing portion is continuously in contact with the rigid member.

16. The membrane element according to claim 1, wherein
   the membrane element comprises at least one open region that is a region above the top surface side or below the bottom surface side of the pleated structure, and
   the at least one open region is separated into the supply region and the exhaust region of gas by the sealing portion.

17. The membrane element according to claim 1, wherein the sealing portion is connected to multiple top or bottom peaks of the pleated structure, forming a space between the sealing portion and top or bottom surface side of the pleated structure, respectively.

18. The membrane element according to claim 1, wherein the sealing portion is connected to at least three top peaks or three bottom peaks of the pleated structure, forming a space between the sealing portion and top or bottom surface side of the pleated structure, respectively.

19. The membrane element according to claim 1, wherein
   the membrane element comprises at least one open region that is a region above the top surface side or below the bottom surface side of the pleated structure, and
   the sealing portion covers the top or bottom of the at least one open region.

* * * * *